(12) United States Patent
Imai et al.

(10) Patent No.: US 10,081,001 B2
(45) Date of Patent: Sep. 25, 2018

(54) POLYMER DISPERSANT FOR CELLULOSE, AQUEOUS DISPERSION TREATMENT AGENT CONTAINING SAME, READILY DISPERSIBLE CELLULOSE COMPOSITION, CELLULOSE DISPERSION RESIN COMPOSITION, AND DISPERSANT-CONTAINING RESIN COMPOSITION FOR CELLULOSE DISPERSION

(71) Applicants: DAINICHISEIKA COLOR & CHEMICALS MFG. CO., LTD., Tokyo (JP); KYOTO UNIVERSITY, Kyoto (JP)

(72) Inventors: Takahiro Imai, Tokyo (JP); Taiyo Aoyagi, Tokyo (JP); Hiroyuki Shimanaka, Tokyo (JP); Yoshinobu Tsujii, Kyoto (JP); Keita Sakakibara, Kyoto (JP); Atsushi Goto, Kyoto (JP)

(73) Assignees: DAINICHISEIKA COLOR & CHEMICALS MFG. CO., LTD., Tokyo (JP); KYOTO UNIVERSITY, Kyoto (JP)

( * ) Notice: Subject to any disclaimer, the term of this patent is extended or adjusted under 35 U.S.C. 154(b) by 86 days.

(21) Appl. No.: 15/125,856

(22) PCT Filed: Mar. 30, 2015

(86) PCT No.: PCT/JP2015/060028
§ 371 (c)(1),
(2) Date: Sep. 13, 2016

(87) PCT Pub. No.: WO2015/152188
PCT Pub. Date: Oct. 8, 2015

(65) Prior Publication Data
US 2017/0001162 A1    Jan. 5, 2017

(30) Foreign Application Priority Data
Mar. 31, 2014   (JP) .............................. 2014-072482

(51) Int. Cl.
| | |
|---|---|
| *B01F 17/00* | (2006.01) |
| *C08J 3/05* | (2006.01) |
| *C08L 1/02* | (2006.01) |
| *C08F 293/00* | (2006.01) |
| *C08G 81/02* | (2006.01) |

(52) U.S. Cl.
CPC ...... *B01F 17/0028* (2013.01); *C08F 293/005* (2013.01); *C08G 81/021* (2013.01); *C08J 3/05* (2013.01); *C08L 1/02* (2013.01); *C08J 2301/02* (2013.01); *C08J 2323/06* (2013.01); *C08J 2401/02* (2013.01); *C08J 2453/00* (2013.01)

(58) Field of Classification Search
CPC ............. B01F 17/0028; C08F 293/005; C08F 297/04; C08G 81/021; C08J 3/05; C08J 3/20
USPC ..................... 524/35; 525/94, 297
See application file for complete search history.

(56) References Cited

U.S. PATENT DOCUMENTS

2017/0002182 A1*   1/2017   Imai .......................... C08J 3/05

FOREIGN PATENT DOCUMENTS

| JP | 2002146116 | 5/2002 |
|---|---|---|
| JP | 2008266630 | 11/2008 |
| JP | 2009138024 | 6/2009 |
| WO | 2012111408 | 8/2012 |
| WO | 2014133019 | 9/2014 |
| WO | 2015152188 | 10/2015 |
| WO | 2015152189 | 10/2015 |

OTHER PUBLICATIONS

Heux et al., "Nonflocculating and Chiral-Nematic Self-ordering of Cellulose Microcrystals Suspensions in Nonpolar Solvents", Langmuir, vol. 16, No. 21, 2000, pp. 8210-8212.
Ljungberg et al., "Nanocomposites of isotactic polypropylene reinforced with rod-like cellulose whiskers", Polymer, vol. 47, 2006, pp. 6285-6292.
Results report, "Development of Polymer Dispersant", NEDO 2013, pp. 39-42.
Sakakibara et al., "Application to a Resin Composite Material of the Polymer Dispersant Suitable for Cellulose Nanofiber", Preprints of The Society of Fiber Science and Technology, vol. 68, No. 1, 2013, p. 2H15.
Sakakibara et al., "Plastic Materials Reinforced with Cellulose Nanofibers Using Polymer Dispersant" Preprints of Seikei-Kakou Annual Meeting vol. 24, 2013, pp. 119-120.

(Continued)

*Primary Examiner* — Edward J Cain
(74) *Attorney, Agent, or Firm* — Hamre, Schumann, Mueller & Larson, P.C.

(57) ABSTRACT

An object of the present invention is to provide a high-performance polymer dispersant that can be applied to cellulose being a hydrophilic substance, and another object of the present invention is to provide a technology for practical application of obtaining a cellulose-dispersed resin composition that realizes stable dispersion of cellulose in a simpler manner and in an environmentally conscious manner that never uses a large amount of organic solvents when the polymer dispersant for cellulose is applied to cellulose and disperses the cellulose in a thermoplastic resin. These objects are achieved by providing a polymer dispersant for cellulose, being a polymer compound including a block copolymer structure having a resin-affinitive segment A and a cellulose-adsorptive segment B, the polymer compound synthesized by a reversible chain transfer catalyzed polymerization (RTCP) method not using any of a heavy metal, a nitroxide compound, and a sulfur-based compound, using an organic iodine compound as an initiation compound, and using a phosphorus compound, a nitrogen compound, an oxygen compound, or a carbon compound as a catalyst.

14 Claims, No Drawings

(56) References Cited

OTHER PUBLICATIONS

Sakakibara et al., "Preparation of Cellulose Nanofiber / Resin composite Materials by Using Di-block Copolymers", Preprints of 2013 Cellulose R&D The 20th Annual Meeting, 2013, p. 67.
Sakakibara et al., "Performance and Structural Evaluation of Cellulose Nanofiber-Reinforced Resin Composite Material Using the Polymer Dispersant" Preprints of The Society of Fiber Science and Technology , vol. 68, No. 2, 2013, p. 72.
Sakakibara et al., "Cellulose Nanofiber-Based Composite Materials with Polymer Brush Components" Sen'i Gakkaishi, vol. 70, No. 8, 2014, pp. 276-280.
Sakakibara et al., "Polymer Dispersants for Cellulose Nanofiber Reinforced Polyolefin Composite Materials", Function & Materials, vol. 34, No. 11, 2014, pp. 40-45.
Tsujii, "Application to the interface function control and a resin composite materials of wood derived from the NC by the polymer dispersant", Nanocellulose Symposium, 2015, pp. 59-62.
International Search Report, issued in the corresponding International Application No. PCT/JP2015/060028, dated Jun. 16, 2015, 5 pages.
Extended European Search Report, issued in the corresponding European patent application 15773476.5, dated Nov. 30, 2017, 7 pages.
International Search Report, issued in the International Application No. PCT/JP2015/060029, dated Jun. 16, 2015, 4 pages, which corresponds to the U.S. Appl. No. 15/125,868.
Extended European Search Report, issued in the European patent application 15773988.9, dated Nov. 30, 2017, 8 pages, which corresponds to the U.S. Appl. No. 15/125,868.
2017/0002182, Jan. 5, 2017, U.S. Appl. No. 15/125,868, filed Sep. 13, 2016.

* cited by examiner

US 10,081,001 B2

POLYMER DISPERSANT FOR CELLULOSE, AQUEOUS DISPERSION TREATMENT AGENT CONTAINING SAME, READILY DISPERSIBLE CELLULOSE COMPOSITION, CELLULOSE DISPERSION RESIN COMPOSITION, AND DISPERSANT-CONTAINING RESIN COMPOSITION FOR CELLULOSE DISPERSION

TECHNICAL FIELD

The present invention relates to a novel technology that can realize widespread utilization of a fine cellulose fiber whose function as an excellent filler has received a lot of attention but whose utilization is not facilitated under the present circumstances because the fine cellulose fiber is a hydrophilic substance and therefore is hard to disperse in resins or other materials, and specifically, the present invention relates to a polymer dispersant for cellulose, a polymer dispersant-containing aqueous dispersion treatment agent, a readily dispersible cellulose composition, a cellulose-dispersed resin composition and a dispersant-containing resin composition for dispersing cellulose.

BACKGROUND ART

A Cellulose fiber is a substance having a basic skeleton of all the plants, is accumulated on the earth in an amount exceeding one trillion tons, and is a resource that is renewable by planting trees, and therefore effective utilization thereof is desired. Although the weight is one fifth of that of steel, the cellulose fiber has strength five times stronger than steel and a low linear thermal expansion coefficient as low as 1/50 of glass fiber. Thus, a technology in which cellulose fiber is contained as a filler in a matrix of a resin or the like to impart mechanical strength to the resin is proposed (Patent Literature 1). Moreover, in order to further improve the mechanical strength of a cellulose fiber, there is a proposal on a fibrous resin reinforcing agent in which the cellulose fiber is defibrated so that a cellulose nanofiber (CNF or microfibrillated plant fiber) may be present in a dispersed state in an additive (Patent Literature 2). Furthermore, as a material obtained by subjecting a cellulose fiber to defibration treatment in the same manner as in producing the CNF, a cellulose nanocrystal (CNC) is known. The CNF is a fiber that is obtained by subjecting a cellulose fiber to defibration treatment such as mechanical defibration and that has a fiber width of about 4 to about 100 nm and a fiber length of about 5 µm or more. The CNC is a crystal that is obtained by subjecting a cellulose fiber to chemical treatment such as acid hydrolysis and that has a crystal width of about 10 to about 50 nm and a crystal length of about 500 nm. These CNF and CNC are collectively called as nanocellulose. Nanocellulose has a high specific surface area (250 to 300 $m^2/g$) and has a lighter weight and a higher strength when compared with steel.

The thermal deformation of nanocellulose is smaller when compared with that of glass. Nanocellulose having a high strength and a low thermal expansion is a useful material as a sustainable type resource material, and creation and development of, for example, a composite material achieving a high strength and a low thermal expansion by combination of nanocellulose and a polymer material such as a resin; an aerogel material; an optically anisotropic material making use of a chiral nematic liquid crystal phase formed by self-organization of CNC, and a high-functional material obtained by introducing a functional group into nanocellulose have been made. On the other hand, nanocellulose plentifully has hydroxy groups and therefore is hydrophilic and strongly polar, which makes nanocellulose inferior in compatibility with general purpose resins that are hydrophobic and nonpolar. Therefore, in the material development using nanocellulose, studies have been conducted on improving the compatibility of nanocellulose with general purpose resins by modifying the surface of nanocellulose or introducing a functional group into nanocellulose through chemical treatment. That is to say, studies on improving dispersibility of nanocellulose to general purpose resins have been conducted.

Moreover, in the preparation of a general purpose resin composition containing a cellulose fiber as a filler, studies have been conducted on improving the dispersibility and compatibility of a cellulose fiber with general purpose resins by adding a dispersant. In Non Patent Literature 1, the dispersibility of a cellulose nanocrystal (cellulose nanowhisker) inorganic solvents is improved by adsorbing a surface active agent to the cellulose nanocrystal. In Non Patent Literature 2, an isotactic polypropylene (iPP) composite material is prepared using, as a reinforcing material, a cellulose nanocrystal to which a surface active agent is adsorbed and the tensile strength of the composite material is improved about 1.4 times stronger than that of the iPP alone. In Patent Literature 2, when cellulose is utilized as a reinforcing material for a thermoplastic resin, an additive (low-molecular weight surface active agent) having affinity to a cellulose fiber and having a particular HLB (hydrophile-lipidophile balance) value is used to create a state in which the cellulose fiber is dispersed in the additive for the purpose of suppressing the occurrence of cellulose aggregates and uniformly dispersing cellulose in a resin.

In any of the above-described conventional examples, tries to improve the dispersibility of nanocellulose by using a low-molecular weight compound as a dispersant have been made. On the other hand, the present inventors have recognized that it is extremely useful for putting a polymer dispersant into practical use that the polymer dispersant, which has been developed for dispersing a fine and hydrophobic substance such as a pigment in a resin or an aqueous medium, can be applied to cellulose being a hydrophilic substance in a simple manner and in an environmentally conscious manner that never uses a large amount of organic solvents. However, as described above, while the conventional polymer dispersants are intended to disperse a pigment or the like that is a fine and hydrophobic substance in resins or other materials, cellulose is a hydrophilic substance, is light in weight and easy to aggregate, and is hard to disperse particularly in general purpose resins, and therefore the conventional polymer dispersants cannot be applied to cellulose in the same manner as in the case of dispersing the pigment or other materials. That is to say, in order to achieve the above-described objects, the development of a polymer dispersant having a structure that can exhibit a desired functionality to cellulose that has characteristics as described above is required.

It is considered herein to have technical advantages as listed below that a polymer dispersant can be used for dispersing cellulose in general purpose resins. First of all, polymers having wide variety of structures can be designed according to monomer design, and therefore molecules can be designed according to the purposes and applications. That is to say, numerous structures as polymer dispersants can be designed and therefore synthesis of higher-performance dispersants, which are fitted to the kinds or other properties of resins to be dispersed, according to molecular design can be expected. It is considered that various kinds of polymers such as olefin-based polymers, acrylic-based polymers, ester-based polymers, and urethane-based polymers can be used as the polymer dispersant. Among the polymers, it is anticipated that acrylic-based polymers in particular are more useful because the acrylic-based monomers are polymerizable under a calm condition to give polymers in a relatively easy manner and wide variety of acrylic-based monomers exist, making molecular design according to the purposes and applications easy by selecting a target composition from among numerous compositions.

Thus, the present inventors have determined to conduct studies on making an acrylic-based polymer a polymer dispersant for cellulose. Further, it is anticipated in making an acrylic-based polymer a polymer dispersant for cellulose that a precision synthesis method is required in order to obtain an acrylic-based polymer that has a particular structure and that is useful for dispersing cellulose that plentifully has hydroxy groups and therefore is inferior in compatibility with hydrophobic general purpose resins not having polarity. Accordingly, the present inventors have considered that it is preferred to make use of a synthesis method employing living radical polymerization with which it is known that acrylic-based polymers having a particular structure can be synthesized. That is to say, the living radical polymerization method can prevent coupling and disproportionation each being a side reaction of radical polymerization, can control molecular weight, and can make a molecular weight distribution narrow by terminal radicals being stabilized. Moreover, since terminal radicals can be stabilized, addition of additional monomer to a reaction system subsequently to polymerization of a certain monomer allows polymerization to progress again and polymer segments each having a different structure can be produced, thereby making it possible to synthesize a block copolymer having a plurality of polymer segments each exhibiting a different functionality.

On the other hand, it is considered that a polymer dispersant for cellulose, the polymer dispersant having a block copolymer structure having therein a plurality of polymer segments each having a different functionality, is useful for the polymer dispersant for cellulose as an object of the present invention from the following reason. The block copolymer has a structure in which two kinds or more of polymer segments each having different components are included in one polymer chain and therefore has an advantage in that different functionalities can be imparted to respective polymer segments by devising monomer compositions. For example, to take an A-B type block copolymer consisting of a chain A and a chain B each having a different monomer composition (different monomer components) as an example for description, when the A-B block copolymer can be designed so that the polymer segment A (chain A) may have a component that has a high affinity to general purpose resins and the polymer segment B (chain B) may have a component that adsorbs to cellulose, the chain A and chain B act effectively to general purpose resins and cellulose respectively by making use of the copolymer as a dispersant for cellulose, and therefore suppression of aggregation of cellulose and stabilization of dispersion of cellulose in general purpose resins can be expected. That is to say, in the case where an A-B block copolymer having a resin-affinitive segment A and a cellulose-adsorptive segment B is used as a dispersant for a cellulose-dispersed resin composition, the dispersibility of cellulose in general purpose resins that are utilized for various kinds of shaped bodies or other products becomes favorable and sufficient enhancement of the mechanical strength of shaped bodies or other products can be expected for the A-B block copolymer as a filler.

As described previously, the living radical polymerization method is suitable for synthesizing such a block copolymer. Various kinds of methods as listed below are specifically reported as the living radical polymerization method. For example, a nitroxide method (Nitroxide Mediated Polymerization method, hereinafter abbreviated as NMP method) that makes use of dissociation and bonding of a nitroxy radical, an atom transfer radical polymerization method (Atom Transfer Radical Polymerization method, hereinafter, abbreviated as ATRP method) in which polymerization is conducted using a heavy metal such as copper, ruthenium, nickel, or iron, and a ligand that forms a complex with the heavy metal, and using a halogen compound as an initiation compound, a reversible addition fragmentation chain transfer polymerization method (Reversible Addition Fragmentation Chain Transfer Polymerization method, hereinafter abbreviated as RAFT method) in which polymerization is conducted using a dithiocarboxylic acid ester as an initiation compound, an addition polymerizable monomer, and a radical initiator, and a method in which a heavy metal compound such as organotellurium, organobismuth, organoantimony, halogenated antimony, organogermanium, or halogenated germanium is used (Degenerative Transfer method, hereinafter abbreviated as DT method), etc. have been developed, and a wide range of research and development on such living radical polymerization methods have been conducted.

CITATION LIST

Patent Literature

Patent Literature 1: Japanese Patent Laid-Open No. 2008-266630
Patent Literature 2: International Publication No. WO2012111408

Non Patent Literature

Non Patent Literature 1: Heux et al., Langmuir, vol. 16, No. 21, 2000, 8210-8212
Non Patent Literature 2: Ljungberg et al., Polymer, vol. 47, 2006, 6285-6292

SUMMARY OF INVENTION

Technical Problem

However, according to studies conducted by the present inventors, it is difficult to say that each of the above-described polymerization methods is optimum as a process for producing a polymer dispersant for cellulose, which can be put into practical use as intended in the present invention, because of problems listed below. Specifically, in the NMP method, it is required that polymerization be conducted at a high temperature of 100° C. or higher, moreover, it is required that polymerization be conducted with a monomer alone without using a solvent in order to raise the polymerization rate, and thus the polymerization conditions are strict. Furthermore, when the methacrylate-based monomers are used, reaction does not progress in the NMP method in general, therefore in order to solve the problem, a special nitroxide compound is needed, and it is complicated and difficult to synthesize the special nitroxide compound.

Moreover, in the ATRP method, there are problems that it is required to use a heavy metal and a resin is colored after polymerization because the heavy metal is left, and therefore the necessity of removing the heavy metal from a polymer to purify the polymer arises even though the amount of the heavy metal is very small. And in the case where the polymer is purified, the heavy metal that has a high environmental load is also contained in waste water or waste solvents produced in the purification process, and therefore it is required to remove the heavy metal therefrom for purification. Moreover, in the ATRP method in which copper is used, it is required that oxygen be removed from the atmosphere of polymerization. In removing oxygen, there is a method in which a reducing agent is added to the atmosphere so that the polymerization may become less likely to be subjected to an influence of oxygen, however there is a possibility that polymerization stops halfway and it is essential to remove oxygen sufficiently. Furthermore, in the method of conducting polymerization including forming a metal complex using an amine compound as a ligand, the existence of an acidic substance inhibits formation of the complex, and therefore it is difficult to conduct polymerization using a monomer having an acid group.

In the RAFT method, it is required that a special compound such as a dithiocarboxylic acid ester be synthesized. Moreover, since a sulfur-based compound is used, unpleasant sulfur-based odor is left, further, coloration occurs, and therefore it is required that these odor and coloration be removed from a polymer. Moreover, when monomers having an amino group are used, polymerization does not progress due to the decomposition of the dithiocarboxylic acid ester.

In the DT method, a heavy metal is used as in the ATRP method, it is required to remove the heavy metal from the polymer as described above, and in the case where the heavy metal is removed, there is a problem of purification of waste water that contains the heavy metal. Furthermore, it is required that a metal catalyst or an organic metal compound be synthesized as necessary, however such synthesis may be complicated and the cost for the synthesis may be high.

As listed above, there are various limitations in the living radical polymerization method, such that: there are limitations in terms of reaction temperatures or concentrations; it is required to use and remove a heavy metal; and a special compound is needed. Accordingly, in the case where a block copolymer is used as a polymer dispersant for cellulose, it cannot necessarily be said that each of the conventional living polymerization methods as listed above is a preferred method as a method for synthesizing the block copolymer, and the development of a living radical polymerization method: through which polymerization progresses under a calm condition; which does not use a heavy metal or a special compound; and which can be conducted simply is desired. The present inventors have recognized that it is practically extremely useful that such a living radical polymerization method can be conducted because high-performance polymer dispersants for cellulose can simply be synthesized and obtained.

The present invention has been completed in consideration of the background of the conventional technologies, and the present invention intends to make it possible to provide, in a simple and economical manner, a high-performance polymer dispersant that can be applied to cellulose being a hydrophilic substance, and intends to achieve putting the polymer dispersant into practical use. The present invention also intends to provide a high-performance polymer dispersant for cellulose through an excellent living radical polymerization method that is simple and that has no problem about the use and removal of a heavy metal. The present invention further intends to obtain a cellulose-dispersed resin composition that realizes stable dispersion of cellulose in a simpler manner and in an environmentally conscious manner that never uses a large amount of organic solvents when the polymer dispersant for cellulose is applied to cellulose to disperse cellulose in a general purpose resin.

Solution to Problem

As a result of diligent studies in order to solve the above-described problems, the present inventors have reached the present invention by finding that a high-performance polymer dispersant for cellulose, the polymer dispersant having a block copolymer structure having a resin-affinitive segment A and a cellulose-adsorptive segment B, can simply be synthesized through a living radical polymerization method not using a heavy metal catalyst, particularly through a reversible chain transfer catalyzed polymerization (RTCP) method being a living radical polymerization method using an organic iodine compound as an initiation compound and using a phosphorus compound, a nitrogen compound, an oxygen compound, or a carbon compound as a catalyst. Furthermore, the present inventors have completed the present invention by finding that the polymer dispersant for cellulose thus obtained can make cellulose readily dispersible to resins by preparing an aqueous dispersion treatment agent that is obtained by dispersing the polymer dispersant for cellulose in an aqueous medium with a surface active agent and then treating cellulose with the treatment agent, or a dispersant resin composition that readily disperses cellulose can be prepared by kneading the polymer dispersant for cellulose or aqueous dispersion treatment agent obtained above with a resin, and therefore stable and favorable dispersion of cellulose in the resin is realized and a cellulose dispersed resin composition that is excellent in mechanical properties is obtained.

The objects can be achieved by the present invention described below. That is to say, the present invention provides a polymer dispersant for cellulose, the polymer dispersant that is used for dispersing cellulose and is a polymer compound having a block copolymer structure having a resin-affinitive segment A and a cellulose-adsorptive segment B, the polymer compound synthesized through a reversible chain transfer catalyzed polymerization (RTCP) method: being a living radical polymerization method not using any of a heavy metal, a nitroxide compound, and a sulfur-based compound; using an organic iodine compound as an initiation compound; and using a phosphorus compound, a nitrogen compound, an oxygen compound, or a carbon compound as a catalyst.

A preferred embodiment of the polymer dispersant for cellulose includes the polymer compound being an A-B block copolymer satisfying all of the following requirements (1) to (5):
(1) 90% by mass or more of constituents of the A-B block copolymer is constituted by a methacrylate-based monomer or methacrylate-based monomers;
(2) 50% by mass or more of constituents of the cellulose-adsorptive segment B is constituted by a methacrylate-based monomer having one or more hydroxy groups and/or a methacrylate-based monomer having a urea group, and the cellulose-adsorptive segment B does not have compatibility with thermoplastic resins;
(3) the resin-affinitive segment A has a number average molecular weight of 500 to 20000 in terms of polystyrene in gel permeation chromatography, and a ratio of the resin-affinitive segment A in the whole A-B block copolymer is 5 to 95% by mass;
(4) the cellulose-adsorptive segment B has a number average molecular weight of 500 to 20000 in terms of polystyrene in gel permeation chromatography, and a ratio of the cellulose-adsorptive segment B in the whole A-B block copolymer is 5 to 95% by mass; and
(5) the A-B block copolymer has a number average molecular weight of 1000 to 40000 in terms of polystyrene in gel permeation chromatography and a molecular weight distribution index (weight average molecular weight/number average molecular weight) of 1.0 to 1.6.

More preferred embodiments of the polymer dispersant for cellulose include the polymer dispersant for cellulose in which:
70% by mass or more of the constituents of the cellulose-adsorptive segment B is constituted by a methacrylate-based monomer having one or more hydroxy groups and/or a methacrylate-based monomer having a urea group in the requirement (2); the resin-affinitive segment A has a number average molecular weight of 1000 to 8000 in terms of polystyrene in gel permeation chromatography, and the ratio of the resin-affinitive segment A in the whole A-B block copolymer is 30 to 70% by mass in the requirement (3); the cellulose-adsorptive segment B has a number average molecular weight of 1000 to 8000 in terms of polystyrene in gel permeation chromatography, and the ratio of the cellulose-adsorptive segment B in the whole A-B block copolymer is 30 to 70% by mass in the requirement (4); and the A-B block copolymer has a number average molecular weight of 2000 to 16000 in terms of polystyrene in gel permeation chromatography and the molecular weight distribution index (weight average molecular weight/number average molecular weight) of 1.0 to 1.6 in the requirement (5).

Moreover, preferred embodiments of the polymer dispersant for cellulose include the polymer dispersant for cellulose in which: in the requirement (2), 70% by mass or more of the constituents of the cellulose-adsorptive segment B is constituted by a methacrylate-based monomer having one or more hydroxy groups and/or a methacrylate-based monomer having a urea group, and 3 to 15% by mass of the constituents of the cellulose-adsorptive segment B is constituted by a methacrylic acid neutralized with an alkali and/or a methacrylate-based monomer having a carboxy group neutralized with an alkali, or constituted by a methacrylate-based monomer having a quaternary ammonium salt group.

The present invention provides as another embodiment a polymer dispersant-containing aqueous dispersion treatment agent containing a polymer dispersant having an improved dispersibility of cellulose, the aqueous dispersion treatment agent obtained by subjecting the polymer dispersant to dispersion treatment in an aqueous medium.

Furthermore, preferred embodiments of any one of the polymer dispersants for cellulose include the polymer dispersant for cellulose in which the cellulose is at least one selected from the group consisting of a cellulose nanofiber, a cellulose nanocrystal, pulp, lignocellulose, and wood flour.

The present invention provides as another embodiment a polymer dispersant-containing aqueous dispersion treatment agent containing a polymer dispersant having an improved dispersibility of cellulose, the aqueous dispersion treatment agent obtained by subjecting any one of the above described polymer dispersants to dispersion treatment with a surface active agent in an aqueous medium. The preferred embodiments of the polymer dispersant-containing aqueous dispersion treatment agent include the polymer dispersant-containing aqueous dispersion treatment agent in which the surface active agent is a cationic surface active agent.

The present invention provides as another embodiment a readily dispersible cellulose composition containing: anyone of the polymer dispersants for cellulose; and at least one kind of cellulose selected from the group consisting of a cellulose nanofiber, a cellulose nanocrystal, pulp, lignocellulose, and wood flour.

The present invention provides as another embodiment a readily dispersible cellulose composition containing: anyone of the aqueous dispersion treatment agents; and at least one kind of cellulose selected from the group consisting of a cellulose nanofiber, a cellulose nanocrystal, pulp, lignocellulose, and wood flour.

The present invention provides as another embodiment a cellulose-dispersed resin composition containing: any one of the readily dispersible cellulose compositions; and a thermoplastic resin.

The present invention provides as another embodiment a dispersant-containing resin composition for dispersing cellulose, the resin composition containing: anyone of the polymer dispersants for cellulose; and a thermoplastic resin.

The present invention provides as another embodiment a dispersant-containing resin composition for dispersing cellulose, the resin composition containing: anyone of the aqueous dispersion treatment agents; and a thermoplastic resin.

The present invention provides as another embodiment a cellulose-dispersed resin composition containing: any one of the dispersant-containing resin compositions for dispersing cellulose; and cellulose.

Advantageous Effects of Invention

According to the present invention, a high-performance polymer dispersant for cellulose that can be applied to cellulose being a hydrophilic substance can be provided in a simple manner. Moreover, according to the present invention, a readily dispersible cellulose composition containing the polymer dispersant and cellulose is provided by treating cellulose with the polymer dispersant in an aqueous medium. Furthermore, according to the present invention, a cellulose-dispersed resin composition can be obtained in a simple manner by kneading the readily dispersible cellulose composition and a thermoplastic resin being a general purpose resin.

Further, according to the present invention, a dispersant resin composition that readily disperses cellulose is provided as another embodiment by kneading the high-performance polymer dispersant for cellulose and a thermoplastic resin. As the preferred embodiment, there is a master batch containing a high concentration of a dispersant. According to the present invention, a cellulose-dispersed resin composition can be provided in a simple manner from such a dispersant resin composition, a resin for dilution, and cellulose such as a cellulose nanofiber, a cellulose nanocrystal, pulp, lignocellulose, or a wood flour.

Use of the polymer dispersant that is provided by the present invention gives a cellulose-dispersed resin composition in a simple manner, can enhance the dispersibility of cellulose, can stabilize the interface between cellulose and a resin, and can enhance the mechanical properties, and therefore the cellulose-dispersed resin composition provided is excellent in mechanical properties. As a result, it is made possible to realize widespread utilization of a fine cellulose fiber, which is a renewable natural material and the function of which as an excellent filler has received a lot of attention but the utilization of which is not facilitated under the present circumstances because the fine cellulose fiber is a hydrophilic substance and therefore is hard to disperse in thermoplastic resins or other materials.

DESCRIPTION OF EMBODIMENTS

The present invention will be described in more detail giving the best mode for carrying out the present invention.

The technical feature of the present invention is that it is made possible to provide a polymer dispersant for cellulose, capable of achieving favorable dispersion of a cellulose fiber being a hydrophilic substance in a thermoplastic resin being a general purpose resin by making use of a living radical polymerization method that can be conducted in a simple manner, particularly by making use of an RTCP method. The living radical polymerization method can prevent coupling and disproportionation each being a side reaction of radical polymerization, can control molecular weight, and can make a molecular weight distribution narrow by terminal radicals being stabilized. Moreover, since terminal radicals can be stabilized, addition of additional monomer to a reaction system subsequently to polymerization of a certain monomer allows polymerization to progress again, and therefore a block copolymer having a plurality of polymer segments each exhibiting a different functionality can be produced. As described above, the living radical polymerization is a suitable method for synthesizing a polymer having a definite structure, and by making use of the method, a polymer compound having a desired structure according to precise design can surely be obtained in a simple manner.

The RTCP method that is utilized in the present invention is a living radical polymerization method that uses an organic iodine compound as an initiation compound and uses a phosphorus compound, a nitrogen compound, an oxygen compound, or a carbon compound as a catalyst and that can easily be conducted by using the polymerization initiation compound and the catalyst in the conventional radical polymerization. The living radical polymerization progresses by the reaction mechanism represented by the reaction formula 1 given below, namely, polymerization progresses by a reversible activation reaction of a dormant species, Polymer-X (P-X), into a propagating radical.

(Reaction Formula 1)

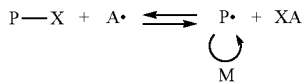

X = I, A = P, N, O, C atom

There is a possibility that the polymerization reaction mechanism changes depending on the kind of catalyst, however the polymerization reaction is considered to progress as follows. In the reaction formula 1, P• generated from a radical initiator reacts with XA to produce a catalyst A• in situ. A• acts as an activation agent of P-X, and by this catalytic action, P-X is activated with high frequency.

The RTCP method that is utilized in the present invention exhibits excellent living polymerizability when methacrylate-based monomers are used. The methacrylate-based monomers of various structures are known, and a lot of monomers are sold on the market as general purpose products. By the RTCP method, a lot of methacrylate-based monomers can be polymerized, and therefore polymers of variety of structures can be designed by selecting monomers to be used. That is to say, the RTCP method is useful in molecular design. Moreover, polymerization can be conducted under a calm condition by the RTCP method. To take polymerization of methacrylate-based monomers as an example, the polymerization progresses under a calm condition of 30° C. to 50° C. for a lot of monomers, meaning that such monomers exhibit a high living polymerizability. Furthermore, in the RTCP method, there is no need to use a compound having a strong odor and a high-cost compound, such as a heavy metal compound and dithiocarboxylic acid esters, and polymerization can be conducted in a simple manner.

The organic iodine compound is not particularly limited as long as the organic iodine compound can generate an iodine radical by the action of light or heat. Specific examples of the organic iodine compound include: alkyl iodides such as 2-iodo-1-phenylethane and 1-iodo-1-phenylethane; and cyano group-containing iodides such as 2-cyano-2-iodopropane, 2-cyano-2-iodobutane, 1-cyano-1-iodocyclohexane, and 2-cyano-2-iodovaleronitrile.

Commercially available organic iodine compounds may be used as they are or organic iodine compounds synthesized by a conventionally known method may be used. The organic iodine compound can be obtained, for example, by reacting an azo compound such as azobisisobutyronitrile with iodine. Moreover, the organic iodine compound may be produced using an iodide salt such as quaternary ammonium iodide or sodium iodide together with an organic halide having a halogen atom other than iodine, such as bromine or chlorine, and causing halogen exchange reaction to occur in a reaction system.

Moreover, in the living radical polymerization, it is preferable to use a catalyst that can generate an iodine radical by abstracting an iodine atom from the iodine compound. Examples of the catalyst include: phosphorus-based compounds such as phosphorus halides, phosphite-based compounds, and phosphinate compounds; nitrogen-based compounds such as imide-based compounds; oxygen-based compounds such as phenol-based compounds; and active carbon atom-containing hydrocarbon compounds such as diphenylmethane-based compounds and cyclopentadiene-based compounds. In addition, these catalysts may be used alone or in combination of two or more.

(Polymer Dispersant)

Next, the polymer dispersant according to the present invention will be described in detail. The polymer dispersant according to the present invention is a polymer compound having a block copolymer structure having a resin-affinitive segment A and a cellulose-adsorptive segment B, the polymer compound synthesized through a particular living radical polymerization method not using any of a heavy metal, a nitroxide compound, and a sulfur-based compound from the reason described above. Furthermore, it is preferable that the polymer compound is an A-B block copolymer satisfying all of the following requirements (1) to (5).

(1) 90% by mass or more of constituents of the A-B block copolymer is constituted by a methacrylate-based monomer or methacrylate-based monomers.

(2) 50% by mass or more of constituents of the cellulose-adsorptive segment B is constituted by a methacrylate-based monomer having one or more hydroxy groups and/or a methacrylate-based monomer having a urea group, and the cellulose-adsorptive segment B does not have compatibility with thermoplastic resins.

(3) The resin-affinitive segment A has a number average molecular weight of 500 to 20000 in terms of polystyrene in gel permeation chromatography, and a ratio of the resin-affinitive segment A in the whole A-B block copolymer is 5 to 95% by mass.

(4) The cellulose-adsorptive segment B has a number average molecular weight of 500 to 20000 in terms of polystyrene in gel permeation chromatography, and a ratio of the cellulose-adsorptive segment B in the whole A-B block copolymer is 5 to 95% by mass.

(5) The A-B block copolymer has a number average molecular weight of 1000 to 40000 in terms of polystyrene in gel permeation chromatography and a molecular weight distribution index (weight average molecular weight/number average molecular weight) of 1.0 to 1.6.

Hereinafter, each of the requirements that are essential for the preferred polymer dispersant according to the present invention will be described. First of all, the preferred polymer dispersant according to the present invention is required to have a block copolymer structure having a resin-affinitive segment A and a cellulose-adsorptive segment B. The block copolymer structure has a structure in which polymer segments each formed by each monomer component of two kinds or more of monomer components each having different characteristics bond through a covalent bond and two kinds or more of the polymer segments each having different characteristics are included in one polymer chain. To take an A-B type block copolymer consisting of two kinds of segments as an example, the A-B type block copolymer has a structure in which a polymer segment A and a polymer segment B each having a different characteristic (functionality) are covalently bonded. The block copolymer has, in a polymer chain, portions in which two kinds or more of monomer components each having a different characteristic are localized for every monomer component and therefore can be expected to exhibit performance of respective components more when compared with a random copolymer in which respective monomer components are randomly arranged. That is to say, by designing the structure of the dispersant so as to have a block copolymer structure having a resin-affinitive segment A and a cellulose-adsorptive segment B, the affinity to resins and the adsorptivity to cellulose can be expected to be fully exhibited by respective polymer chains. In the present invention, the structure of the preferred polymer dispersant is designed so as to have an A-B block copolymer structure having a resin-affinitive segment A and a cellulose-adsorptive segment B from the reason as described previously.

In the preferred polymer dispersant according to the present invention, it is required that, as described in the requirement (1), 90% by mass or more of the constituents be constituted by a methacrylate-based monomer or methacrylate-based monomers. This comes from the reason as follows. The reason is, as described previously, mainly that the RTCP method that is utilized in the present invention can exhibit an excellent living polymerizability, gives favorable polymerization yields, makes the molecular weight distribution narrow, and makes preparation of block copolymers or gradient copolymers easy when methacrylate monomers are used. More specifically, when acrylic-based monomers, styrene-based monomers, or vinyl-based monomers are present, the molecular weight distribution may become broad or polymerization yields may be lowered, and therefore, in the present invention, it is required for the polymer dispersant that 90% by mass or more of the constituents be constituted by a methacrylate-based monomer or methacrylate-based monomers. By designing the polymer dispersant according to the present invention so that 90% by mass of the constituents may be constituted by a methacrylate-based monomer or methacrylate-based monomers, a block copolymer becomes the one in which differences among respective block structures are more definite and becomes a dispersant more excellent in functionalities.

In the preferred polymer dispersant according to the present invention, it is required that, as described in the requirement (2), 50% by mass or more of the cellulose-adsorptive segment B be constituted by a methacrylate-based monomer having one or more hydroxy groups and/or a methacrylate-based monomer having a urea group and the cellulose-adsorptive segment B not have compatibility with thermoplastic resins. This comes from the reasons as follows. One reason is that, as described in the requirement (1), it is required for the polymer dispersant that 90% by mass or more of the constituents be constituted by a methacrylate-based monomer or methacrylate-based monomers. Moreover, the second reason is that when the polymer dispersant is constituted as described in the requirement (2), the polymer dispersant has a structure having a hydroxy group and/or a urea group in a segment and therefore the segment is considered to exhibit a good effect as a cellulose-adsorptive segment B in the A-B block copolymer. The action is considered to be achieved from the reason as follows. First of all, cellulose has hydroxy groups in the skeleton thereof and is a very strong and water-insoluble polymer because of the action of hydrogen bonds between hydroxy groups. It is considered that such hydroxy groups in cellulose and hydroxy groups and/or urea groups in the segment B that constitutes the polymer dispersant according to the present invention bond together through hydrogen bonds and, as a result, the dispersant functions so as to be adsorbed to cellulose. According to studies conducted by the present inventors, it is preferable that the ratio of the hydroxy group component and/or the urea group in the constituents of the cellulose-adsorptive segment B is 60% by mass or more, and more preferably 70% by mass or more. On the other hand, when the ratio of the methacrylate-based monomer having one or more hydroxy groups and/or the methacrylate-based monomer having a urea group that constitute the segment B is less than 50% by mass, the effect as the cellulose-adsorptive segment B is insufficient and the effect as the dispersant is not exhibited sufficiently.

Moreover, the cellulose-adsorptive segment B that constitutes the preferred polymer dispersant according to the present invention must not have affinity to, namely compatibility with, resins for use as a dispersion medium. The reason is that even though the segment is adsorbed to cellulose, the hydrogen bond in the adsorption is physical adsorption and there is a possibility that the segment is desorbed from cellulose due to dispersion of the segment in the resin or due to heating if the compatibility of the segment with the resin is favorable. That is to say, when the compatibility of the segment with the resin is poor, the segment never mixes with the resin and therefore the segment functions so as to maintain the dispersion state of cellulose without being desorbed from cellulose. Also from this standpoint, the amount of the acrylate-based monomer having one or more hydroxy groups and/or the acrylate-based monomer having a urea group is set to 50% by mass or more of the constituents of the segment B. This is because when the amount is less than 50% by mass, additional methacrylate-based monomer has to be one of the constituents and there is a possibility that the compatibility of the segment with the resin is exhibited depending on the additional methacrylate-based monomer component to be selected.

Also from this standpoint, the amount of the methacrylate-based monomer having one or more hydroxy groups and/or the methacrylate-based monomer having a urea group is preferably 60% by mass or more, and more preferably 70% by mass or more as described previously. The thermoplastic resin being a general purpose resin as an object in which cellulose is dispersed in the present invention has a low polarity in general, and therefore is less likely to be compatible with the cellulose-adsorptive segment B being a polymer having a large amount of hydroxy groups and/or urea groups and having a high polarity.

In the preferred polymer dispersant according to the present invention, it is required that, as described in the requirement (3), the resin-affinitive segment A have a number average molecular weight of 500 to 20000 in terms of polystyrene in gel permeation chromatography. Furthermore, it is more preferable that the number average molecular weight is about 1000 to about 8000 in order to exhibit a high affinity to resins (compatibility with resins). The range is in a molecular weight region where the efficiency of exhibiting the affinity to resin of the resin-affinitive segment A is considered to be the highest. Furthermore, in the preferred polymer dispersant according to the present invention, the ratio of the resin-affinitive segment A in the whole dispersant is required to be 5 to 95% by mass, more preferably 30 to 70% by mass. According to studies conducted by the present inventors, when the ratio is less than 5% by mass, the amount of the resin-affinitive component is relatively small and there is a tendency that the affinity to resins cannot be exhibited sufficiently. On the other hand, when the ratio is larger than 95% by mass, the amount of the cellulose-adsorptive component is relatively small and the adsorptivity to cellulose cannot be exhibited sufficiently in some cases.

In the preferred polymer dispersant according to the present invention, it is required that, as described in the requirement (4), the cellulose-adsorptive segment B have a number average molecular weight of 500 to 20000 in terms of polystyrene in gel permeation chromatography. Furthermore, it is more preferable that the number average molecular weight is about 1000 to about 8000 in order to exhibit a high adsorptivity to cellulose. The range is considered to be in a molecular weight region where the efficiency of exhibiting adsorption to cellulose of the cellulose-adsorptive segment B is considered to be the highest. Furthermore, in the preferred polymer dispersant according to the present invention, the ratio of the cellulose-adsorptive segment B in the whole dispersant is required to be 5 to 95% by mass. The ratio is more preferably 30 to 70% by mass. When the ratio is less than 5% by mass, the amount of the cellulose-adsorptive component is relatively small, and therefore there is a tendency that cellulose adsorptivity cannot be exhibited sufficiently. On the other hand, when the ratio is larger than 95% by mass, the amount of the resin-affinitive component is relatively small, and therefore the affinity to resins cannot be exhibited sufficiently.

In the preferred polymer dispersant according to the present invention, it is required, as described in the requirement (5), the copolymer have a number average molecular weight of 1000 to 40000 in terms of polystyrene in gel permeation chromatography. Furthermore, it is more preferable that the number average molecular weight is about 2000 to about 16000. This is because there is a risk that cellulose cannot effectively be treated with the polymer dispersant when the molecular weight becomes too large. Furthermore, the molecular weight distribution index (weight average molecular weight/number average molecular weight) of the copolymer is required to be 1.0 to 1.6. It is more preferable that the molecular weight distribution index is 1.0 to 1.5. The molecular weight distribution index of the polymer dispersant shows an extent of the molecular weight distribution, and a small molecular weight distribution index value means that the distribution of the molecular weight of the dispersant (copolymer) is narrow, namely that the uniformity of the molecular weight is high. Narrow molecular weight distribution means that both the amount of polymer dispersants having a large molecular weight and the amount of polymer dispersants having a small molecular weight are small and the characteristics of the polymer dispersants become uniform, and can make the effect of imparting a fine dispersion state of high level to cellulose brought about by the polymer dispersant more improved.

From what has been described above, more preferable polymer compounds that favorably function as the polymer dispersant according to the present invention include the following embodiment. That is to say, in the requirement (2), 70% by mass or more of the constituents of the cellulose-adsorptive segment B is constituted by a methacrylate-based monomer having one or more hydroxy groups and/or a methacrylate-based monomer having a urea group and the segment B does not have compatibility with thermoplastic resins; in the requirement (3), the resin-affinitive segment A has a number average molecular weight of 1000 to 8000 in terms of polystyrene in gel permeation chromatography and the ratio of the resin-affinitive segment A in the whole copolymer is 30 to 70% by mass; in the requirement (4), the cellulose-adsorptive segment B has a number average molecular weight of 1000 to 8000 in terms of polystyrene in gel permeation chromatography and the ratio of the cellulose-adsorptive segment B in the whole copolymer is 30 to 70% by mass; and in the requirement (5), the copolymer has a number average molecular weight of 2000 to 16000 in terms of polystyrene in gel permeation chromatography and a molecular weight distribution index (weight average molecular weight/number average molecular weight) of 1.0 to 1.6.

Next, preferred monomers for forming the resin-affinitive segment A and the cellulose-adsorptive segment B each satisfying the above-described respective requirements and each constituting the preferred polymer dispersant according to the present invention will be described.

<Resin-Affinitive Segment A>

The resin-affinitive segment A is for making the surface of cellulose hydrophobic through the cellulose-adsorptive segment B, and as a result, the polymer dispersant according to the present invention can be applied to cellulose being a hydrophilic substance. As one of the basics of the affinity to resins, it is preferable that the resin-affinitive segment A has a structure similar to that of a resin as an object or has hydrophobicity similar to that of a resin as an object to which the resin-affinitive segment A has affinity, and therefore the main component of the resin-affinitive segment A is determined to be a methacrylate-based monomer from the constitutional requirement (1) for the preferred polymer dispersant according to the present invention. Specific examples of the monomer component for forming the resin-affinitive segment A for use in the present invention include alkyl-, alkenyl-, cycloalkyl-, aromatic ring-, and halogen-containing methacrylates such as methyl methacrylate, ethyl methacrylate, n-propyl methacrylate, isopropyl methacrylate, t-butyl methacrylate, hexyl methacrylate, 2-ethylhexyl methacrylate, lauryl methacrylate, tetradecyl methacrylate, octadecyl methacrylate, cyclohexyl methacrylate, t-butylcyclohexyl methacrylate, bornyl methacrylate, isobornyl methacrylate, dicyclopentanyl methacrylate, dicyclopentenyloxyethyl methacrylate, benzyl methacrylate, tetrahydrofurfuryl methacrylate, octafluorooctyl methacrylate, and tetrafluoroethyl methacrylate. Preferably, methacrylates to which a low-polarity hydrocarbon group having a number of carbon atoms of 1 to 18, or more preferably a low-polarity hydrocarbon group having a number of carbon atoms of 8 or more is bonded may be used. The reason is that such methacrylates have a favorable compatibility and a favorable mixing property with thermoplastic resins to be used.

<Cellulose-Adsorptive Segment B>

According to studies conducted by the present inventors, the cellulose-adsorptive segment B shows the interaction to hydroxy groups present on the surface of cellulose through hydrogen bonds. As described in the requirement (2), in the preferred cellulose-adsorptive segment B, 50% by mass or more of the constituents of the cellulose-adsorptive segment B is constituted by a methacrylate-based monomer having one or more hydroxy groups and/or a methacrylate-based monomer having a urea group. By constituting the cellulose-adsorptive segment B as such, hydrogen bonds are formed between hydroxy groups present on the surface of cellulose and the cellulose-adsorptive segment B and multi-point interaction is exhibited in the polymer chain, allowing the cellulose-adsorptive segment B to be effectively adsorbed to cellulose. That is to say, the cellulose-adsorptive segment B is effectively adsorbed to cellulose, and as a result, cellulose is made to be hydrophobic due to the effect of the resin-affinitive segment A in the structure of the polymer dispersant. Moreover, the cellulose-adsorptive segment B must not have compatibility with (affinity to) resins as a dispersion medium. In the present specification, the affinity means that two substances can be mixed with each other and exhibit compatibility to each other. It is not preferable that a resin and the segment B have affinity to each other because the segment B adsorbed to cellulose is also affinitive to the resin and may be desorbed from cellulose and thus a favorable dispersion state may not be exhibited.

From the constitutional requirement (1) for the preferred polymer dispersant according to the present invention, the main component of the cellulose-adsorptive segment B is determined to be a methacrylate-based monomer. Specific examples of the methacrylate-based monomer that is for forming the cellulose-adsorptive segment B and that has one or more hydroxy groups include hydroxy group-containing methacrylates such as 2-hydroxyethyl methacrylate, 2-hydroxypropyl methacrylate, 3-hydroxypropyl methacrylate, 2-hydroxybutyl methacrylate, 3-hydroxybutyl methacrylate, 4-hydroxybutyl methacrylate, polyethylene glycol monomethacrylates, polypropylene glycol monomethacrylates, and glyceryl methacrylate.

Examples of the methacrylate-based monomer that is for forming the cellulose-adsorptive segment B and that has a urea group include methacryloyloxyethyl urea and methacryloyloxyethyl ethylene urea.

Moreover, as a monomer that constitutes the cellulose-adsorptive segment B and that is other than the above-described methacrylate-based monomers, the alkyl-, alkenyl-, cycloalkyl-, aromatic ring-, or halogen-containing methacrylates can be used, and furthermore, alkoxy group- or glycidyl group-containing methacrylate-based monomers can be used in a range of use as described previously. Specific examples of such monomers include methoxyethyl methacrylate, ethoxyethyl methacrylate, methoxypropyl methacrylate, methoxy polyethylene glycol methacrylates, ethoxy polyethylene glycol methacrylates, glycidyl methacrylate, 3,4-epoxycyclohexyl methacrylate, methacryloyloxyethyl glycidyl ether, and methacryloyloxyethoxyethyl glycidyl ether. It is to be noted herein that any of the expressions "poly" and "(poly)" above means n=2 or more. Among the monomers, 2-hydroxyethyl methacrylate, glyceryl methacrylate, and methacryloyloxyethyl ethylene urea are preferable because they are general purpose monomers, have a small molecular weight per one hydroxy group or one urea group and can make the number of functional groups large resulting in enhancement of the effects, and have poor compatibility with resins.

Hereinafter, a still more preferable constitution of the cellulose-adsorptive segment B that constitutes the preferred polymer dispersant according to the present invention will be described. As a more preferred embodiment, there is a case where it is preferable to conduct emulsification making the amount of a surface active agent as small as possible, and in such a case, when the cellulose-adsorptive segment B is formed, it is preferable that 3 to 15% by mass of the monomer components for forming the cellulose-adsorptive segment B is constituted by a methacrylic acid neutralized with an alkali and/or a methacrylate-based monomer having a carboxy group neutralized with an alkali, or by a methacrylate-based monomer having a quaternary ammonium salt. These monomers are ionized monomers. The reason is as follows. When a monomer that is affinitive to water, such as the neutralized carboxy group or the quaternary ammonium salt, is present as a constituent of the cellulose-adsorptive segment B, the cellulose-adsorptive segment B can suitably be used in a polymer dispersant-containing aqueous dispersion treatment agent by the effect of enhancing the adsorptivity of the cellulose-adsorptive segment B to cellulose, and, in addition to this effect, by constituting the cellulose-adsorptive segment B as such, which will be described later. That is to say, by introducing a functional group such as a carboxy group or a quaternary ammonium group in the structure of the cellulose-adsorptive segment B, the segment B dissolves in water, and therefore the polymer dispersant according to the present invention which contains the A-B block copolymer can be made so as to be self-emulsifying, and by this constitution, there is an effect of assisting an emulsifying property of a surface active agent. As a result, an aqueous dispersion treatment agent can readily be prepared.

Examples of the methacrylic acid and/or the methacrylate-based monomer having a carboxy group, and the methacrylate-based monomer having a quaternary ammonium salt, which are used for forming the cellulose-adsorptive segment B, include the following monomers. Specific examples of the monomers include methacrylic acid, methacrylates having a carboxy group and being obtained by reacting a polybasic acid such as phthalic acid with a methacrylate-based monomer having a hydroxy group, such as 2-hydroxyethyl methacrylate, and quaternary ammonium salt-containing methacrylate-based monomers obtained by quaternizing dimethylaminoethyl methacrylate, diethylaminoethyl methacrylate, or the like with methyl chloride, benzyl chloride, or dimethyl sulfate. Methacrylic acid and quaternary ammonium salts obtained from dimethylaminoethyl methacrylate and methyl chloride or benzyl chloride in which there is no possibility of hydrolysis are preferable because of their high versatility. Moreover, neutralization is conducted with an alkali, however the alkali is not particularly limited. Examples of the alkali include: ammonia; organic amines such as dimethylaminoethanol; and hydroxides such as sodium hydroxide and potassium hydroxide.

Moreover, the amount of the ionized methacrylate introduced in the cellulose-adsorptive segment B is 3 to 15% by mass in the segment B. When the amount introduced is less than 3% by mass, the self-emulsifying property is deficient and a surface active agent is needed as will be described later, and when the amount introduced is more than 15% by mass, there is a possibility that water resistance is lowered. The amount introduced is more preferably 5 to 13% by mass. Furthermore, the ionized methacrylate must not be introduced in the resin-affinitive segment. The compatibility with resins is poor due to ionization, and therefore there is a possibility that the dispersion of cellulose is inhibited.

(Cellulose)

Next, cellulose to which the polymer dispersant for cellulose according to the present invention is applied is described in detail. The present invention provides a polymer dispersant for cellulose, and as cellulose to be an object of the dispersion, it is preferable that the cellulose is at least one selected from the group consisting of a cellulose nanofiber (hereinafter, written as CNF), a cellulose nanocrystal (hereinafter, written as CNC), pulp, lignocellulose, and wood flour. Particularly, it is more preferable to use the CNF or the CNC. In the present invention, the CNF and the CNC are referred to as "nanocellulose". Hereinafter, each type of the cellulose will be described in detail.

Examples of the plant fiber used as a raw material for cellulose (or cellulose fiber) include: natural cellulose obtained from a natural plant raw material such as wood, bamboo, hemp, jute, kenaf, cotton, beet, residue waste from agricultural products, and cloth; and regenerated cellulose fibers such as pulp (paper), rayon, and cellophane. Examples of the wood include, but not limited to, Sitka spruce, cedar, hinoki cypress, blue gum, and acacia, and examples of the paper include, but not limited to, deinked waste paper, cardboard waste paper, magazines, and copying paper. The plant fibers may be used alone or two or more plant fibers selected from these plant fibers may be used.

Lignocellulose is a main component of the plant fiber, is mainly constituted from cellulose, hemicellulose, and lignin, and has a structure in which cellulose, hemicellulose, and lignin are combined to one another, thereby forming the plant fiber. The plant fiber that contains lignocellulose is subjected to mechanical treatment or chemical treatment to remove hemicellulose and lignin and increase the purity of cellulose, and thus pulp is obtained. Bleaching treatment is conducted as necessary, and the amount of lignin in the pulp can be adjusted by adjusting the amount of delignification. Preferable examples of pulp include: chemical pulp [kraft pulp (KP), sulfite pulp (SP)], semichemical pulp (SCP), chemiground pulp (CGP), chemimechanical pulp (CMP), groundwood pulp (GP), refiner mechanical pulp (RMP), thermomechanical pulp (TMP), and chemi-thermo mechanical pulp (CTMP) obtained by subjecting a plant fiber to mechanical treatment or chemical treatment to conduct pulping; and deinked waste paper pulp, cardboard waste paper pulp, magazine waste paper pulp using the above-described pulp as a main component. Among these pulps, various kraft pulps derived from softwood with high fiber strength [softwood unbleached kraft pulp (NUKP), oxygen-prebleached softwood kraft pulp (NOKP), and softwood bleached kraft pulp (NBKP)] are particularly preferably used. The lignin content in pulp is not particularly limited, but is normally about 0 to about 40% by mass and preferably about 0 to about 10% by mass. The lignin content can be measured by a Klason method.

The nanocellulose that can suitably be used in the present invention refers to cellulose obtained using a cellulose fiber-containing material (such as, for example, wood pulp) and disaggregating the fiber of the cellulose fiber-containing material to a nano-size level (subjecting the fiber to defibration treatment), and includes the CNF and the CNC. A cellulose microfibril (single cellulose nanofiber) having a width of about 4 nm is present as a minimum unit in the cell walls of a plant fiber and is a substance having a basic skeleton of plants, and the nanocellulose is nano-sized cellulose formed by a cellulose microfibril or by a plurality of cellulose microfibril being aggregated.

In nanocellulose, the CNF is a fiber obtained by subjecting a cellulose fiber to treatment such as mechanical treatment, the fiber having a fiber width of about 4 to about 200 nm and a fiber length of about 5 µm or more. The specific surface area of the CNF is preferably about 70 to about 300 $m^2/g$, more preferably about 70 to about 250 $m^2/g$, and still more preferably about 100 to about 200 $m^2/g$. In the case where a composition is prepared in combination of the CNF and a resin, by making the specific surface area of the CNF large, the contact area can be made large and the strength is improved. Moreover, when the specific surface area is extremely large, aggregation of the resin composition in the resin is liable to occur and a high-strength material as intended may not be obtained. The average value of the fiber diameter of the CNF is normally about 4 to about 200 nm, preferably about 4 to about 150 nm, and particularly preferably about 4 to about 100 nm.

Examples of a method for defibrating the plant fiber to prepare the CNF include a method of defibrating a cellulose fiber-containing material such as pulp. AS the defibration method, for example, a method in which an aqueous suspension liquid or a slurry of the cellulose fiber-containing material is mechanically ground or beaten with a refiner, a high-pressure homogenizer, a grinder, a single-screw or multi-screw kneader (preferably, twin-screw kneader), a bead mill, or the like can be used. Treatment may be conducted in combination of the above-described defibration methods as necessary. As the defibration treatment method, for example, a defibration method described in Japanese Patent Laid-Open No. 2011-213754 or Japanese Patent Laid-Open No. 2011-195738 can be used.

Moreover, the CNC is a crystal obtained by subjecting a cellulose fiber to chemical treatment such as acid hydrolysis, and is a crystal having a crystal width of about 4 to about 70 nm and a crystal length of about 25 to about 3000 nm. The specific surface area of the CNC is preferably about 90 to about 900 $m^2/g$, more preferably about 100 to about 500 $m^2/g$, and still more preferably about 100 to about 300 $m^2/g$. In the case where a composition is prepared in combination of the CNC and a resin, by making the specific surface area of the CNC large, the contact area can be made large and the strength is improved. Moreover, when the specific surface area is extremely large, aggregation of the resin composition in the resin is liable to occur and a high-strength material as intended may not be obtained. The average value of the crystal widths of the CNC is normally about 10 to about 50 nm, preferably about 10 to about 30 nm, and particularly preferably about 10 to about 20 nm. The average value of the crystal lengths of the CNC is normally about 500 nm, preferably about 100 to about 500 nm, and particularly preferably about 100 to about 200 nm.

As a method for defibrating the plant fiber to prepare the CNC, publicly known methods can be adopted. For example, a chemical method such as a method in which an aqueous suspension liquid or a slurry of the cellulose-containing material is subjected to acid hydrolysis with sulfuric acid, hydrochloric acid, hydrobromic acid, or other acids can be used. Treatment may be conducted in combination of the above-described defibration methods as necessary.

The average value of the fiber diameters (the same applies to average fiber diameter, average fiber length, average crystal width, and average crystal length) of nanocellulose in the present invention is an average value that is taken when the fiber diameters of at least 50 fibers of the nanocellulose in a visual field of an electron microscope are measured.

Nanocellulose has a high specific surface area (preferably about 200 to about 300 $m^2/g$), has a lighter weight and a higher strength when compared with steel, and has a smaller thermal deformation (lower thermal expansion) when compared with glass.

Nanocellulose having a cellulose type-I crystalline structure and having a high crystallinity, as high as 50% or more, is preferable. The cellulose type-I crystallinity of nanocellulose is more preferably 55% or more and still more preferably 60% or more. The upper limit of the cellulose type-I crystallinity of nanocellulose is generally about 95% or about 90%.

The cellulose type-I crystalline structure refers to, for example, the crystal structure as described in pages 81 to 86 or pages 93 to 96 in "Encyclopedia of Cellulose, ("Serurosu no Jiten" in Japanese)", the first copy of publication in a new format or binding, published by Asakura Publishing Co., Ltd., and most of natural cellulose has a cellulose type-I crystalline structure. On the other hand, a cellulose fiber not having a cellulose type-I crystalline structure and having, for example, a cellulose type-II, III, or IV structure is derived from cellulose having a cellulose type-I crystalline structure. Among the crystalline structures, the type-I crystalline structure has a higher crystalline elastic modulus when compared with other structures.

As the cellulose for use in the present invention, nanocellulose having a type-I crystalline structure is preferable among the above-described types of nanocellulose. When cellulose is a type-I crystal, a composite material having a low linear expansion coefficient and a high elastic modulus can be obtained when the composite material is prepared from nanocellulose and a matrix resin. Nanocellulose having a type-I crystalline structure can be identified from the fact that the nanocellulose has typical peaks at two positions around $2\theta=14°$ to $17°$ and around $2\theta=22°$ to $23°$ in a diffraction profile obtained by measuring wide angle X-ray diffraction.

For example, ethanol is added to a slurry of nanocellulose to adjust the concentration of nanocellulose to be 0.5% by mass. Subsequently, the slurry is stirred with a stirrer, and filtration under reduced pressure (using 5C filter paper manufactured by Advantec Toyo Kaisha, Ltd.) is started immediately after stirring. Subsequently, the wet web thus obtained is subjected to thermocompression with a pressure of 0.1 t at 110° C. for 10 minutes to obtain a 50 $g/m^2$ CNF sheet. The crystallinity of cellulose type-I nanocellulose is determined by measuring the CNF sheet with an X-ray generation apparatus ("UltraX18HF" manufactured by Rigaku Corporation) under the measurement condition that a target Cu/Kα ray is used with a voltage of 40 kV, an electric current of 300 mA, a scanning angle ($2\theta$) from 5.0° to 40.0°, and a step angle of 0.02°.

The degree of polymerization of cellulose is about 500 to about 10000 for natural cellulose and is about 200 to about 800 for regenerated cellulose. In cellulose, some cellulose fibers each linearly extended by β-1,4 bonds form a bundle, and in the bundle, the cellulose fibers are fixed by intramolecular or intermolecular hydrogen bonds to form a crystal in which cellulose is in a state of an extended chain. It has been made clear that a lot of crystal forms exist in cellulose crystals by X-ray diffraction analysis or solid NMR analysis, however the crystal form of natural cellulose is only type-I. From X-ray diffraction or other analytical methods, it is inferred that the ratio of a crystal region in cellulose is about 50 to about 60% for wood pulp and, for bacterial cellulose, the ratio is higher than that for wood pulp and is about 70%. Cellulose not only has a high elastic modulus but also exhibits strength that is 5 times stronger than that of steel and linear expansion coefficient that is ⅕₀ lower than that of glass, which is caused by the fact that cellulose has an extended chain crystal. Conversely, breaking the crystal structure of cellulose leads to losing excellent characteristics of cellulose, such as a high elastic modulus and a high strength.

(Method for Treating Cellulose with Polymer Dispersant in System Containing Water as Main Medium)

A readily dispersible cellulose composition containing a polymer dispersant and cellulose can be obtained by treating cellulose with the polymer dispersant for cellulose according to the present invention. The readily dispersible cellulose composition thus obtained can be used as a precursor for obtaining the cellulose-dispersed resin composition according to the present invention that is a final target in the present invention. According to studies conducted by the present inventors, it is preferable as a method for treating cellulose with the polymer dispersant according to the present invention that, as described previously, an ionic methacrylate is introduced into the cellulose-adsorptive segment to make the polymer dispersant self-emulsifying, thereby preparing an aqueous dispersion treatment agent. In the case where water resistance is intended to be improved more, it is preferable that an aqueous dispersion liquid of a polymer dispersant using a cationic surface active agent is used as an aqueous dispersion treatment agent and the aqueous dispersion treatment agent is added to cellulose. By constituting the cellulose composition as such, the readily dispersible cellulose composition that is useful as a precursor for obtaining the cellulose-dispersed resin composition according to the present invention is obtained.

The reason for this is considered to be as follows. In order to obtain the effects of the polymer dispersant sufficiently, it is important how effectively the polymer dispersant can be adsorbed to cellulose being a hydrophilic substance. On the other hand, in order to suppress the aggregation of cellulose, it is preferable to conduct treatment in a system containing water as the main medium, and conducting treatment in a system containing water as the main medium while making the amount of organic solvents used small is preferable also from environmental consideration. As a result of conducting diligent studies in view of these requirements, the present inventors have found a simple method for obtaining, in a system containing water as the main medium, a readily dispersible cellulose composition that is useful as a precursor for obtaining a cellulose-dispersed resin composition. That is to say, it is effective to introduce a methacrylate-based monomer having an ionic group in the cellulose-adsorptive segment B to make the polymer dispersant self-emulsifying. Further, as another method, because a dispersion liquid can be prepared in a solvent containing water as the main component from the polymer dispersant according to the present invention by using a surface active agent, by constituting the dispersion liquid as such, an aqueous dispersion liquid of the polymer dispersant can be added to cellulose, and thus it becomes possible to treat cellulose with the polymer dispersant in the system containing water as the main medium. According to detailed studies conducted by the present inventors, more preferably, the polymer dispersant is dissolved in a hydrophilic organic solvent solution in the first place, then a cationic surface active agent is added thereto, thereafter water is further added to the resultant mixture to prepare an aqueous dispersion liquid containing the polymer dispersant and use it as a treatment agent, and thus a useful, readily dispersible cellulose composition can be obtained. Furthermore, when the treatment agent thus obtained and containing the aqueous dispersion liquid of the polymer dispersant is added to cellulose, it is preferable to use cellulose in a water-containing state because, in the treatment process, stirring is easy to conduct and uniform mixing treatment is easy to conduct from the reason described above.

The cationic surface active agent for use in the aqueous dispersion liquid is not particularly limited, and conventionally known cationic surface active agents can be used. Specific examples of the cationic surface active agent include alkanoates, phosphates, and sulfonates of organic amines, surface active agents having a betaine structure, and surface active agents of quaternary ammonium salts. Moreover, the amount of the surface active agent used relative to the polymer dispersant is not particularly limited, but is about 5 to about 30% and more preferably 10 to 20% based on mass relative to 100 of the polymer surface active agent. When the amount of the surface active agent is less than 5%, a sufficient emulsified state cannot be obtained, and when the amount exceeds 30%, there is a possibility that the surface active agent has an adverse effect on physical properties.

(Preparation of Cellulose-Dispersed Resin Composition-1)

The cellulose-dispersed resin composition according to the present invention can be obtained by melt-kneading the readily dispersible cellulose composition obtained in a manner as described above and a general purpose resin, etc. As the resin used in preparing the cellulose-dispersed resin composition, thermoplastic resins are preferable because it is preferable to obtain the cellulose-dispersed resin composition through melt-kneading. Examples of the thermoplastic resin include olefin-based resins, nylon resins, polyamide-based resins, polycarbonate-based resins, polysulfone-based resins, polyester-based resins, and cellulose-based resins such as triacetylated cellulose and diacetylated cellulose. Examples of the polyamide-based resin include polyamide 6 (PA6, ring-opening polymerization product of ε-caprolactam), polyamide 66 (PA66, polyhexamethyleneadipamide), polyamide 11 (PA11, polyamide obtained through ring-opening polycondensation of undecane lactam), polyamide 12 (PA12, polyamide obtained through ring-opening polycondensation of lauryl lactam) and rubber resins before vulcanization.

Among the above-described thermoplastic resins, it is preferable to use the olefin-based resins because the olefin-based resins have advantages that the stiffening effect can sufficiently be obtained when used for preparing a cellulose-dispersed resin composition and that the olefin-based resins are inexpensive. Examples of the olefin-based resin include polyethylene-based resins, polypropylene-based resins, vinyl chloride resins, styrene resins, (meth)acrylic resins, and vinyl ether resins. These thermoplastic resins may be used alone or may be used as a mixed resin of two or more thereof. Among the olefin-based resins, polyethylene-based resins (PE) such as high density polyethylene (HDPE), low density polyethylene (LDPE), and bio-polyethylene, polypropylene resins (PP), vinyl chloride resins, styrene resins, (meth)acrylic resins, and vinyl ether resins, etc. are preferable because these resins have advantages that the stiffening effect can sufficiently be obtained when used for preparing a cellulose-dispersed resin composition and that these resins are inexpensive. The cellulose-dispersed resin composition thus obtained has a favorable dispersibility of cellulose and favorable mechanical properties due to the polymer dispersant according to the present invention.

(Method for Treating Resin with Polymer Dispersant)

A dispersant-containing resin composition for dispersing cellulose, the resin composition having a favorable dispersibility of cellulose, can be obtained by kneading the polymer dispersant for dispersing cellulose according to the present invention with a resin in advance. The dispersant-containing resin composition thus obtained becomes a precursor for the cellulose-dispersed resin composition. In order to make the dispersibility of cellulose satisfactory in preparing the dispersant-containing resin composition, it is required that the resin and the polymer dispersant be uniformly dispersed, however the dispersant-containing resin composition for dispersing cellulose, the resin composition using the polymer dispersant according to the present invention, can secure a lot of hydrophilic points on the resin surface that has normally a poor affinity to the hydrophilic cellulose surface. Moreover, when the dispersant-containing resin composition for dispersing cellulose according to the present invention is used as a master batch containing a high concentration of the polymer dispersant, the dispersant-containing resin composition according to the present invention increases the degree of freedom for setting concentrations when kneaded with cellulose in the following steps, and as a result, the dispersion-containing resin composition for dispersing cellulose according to the present invention becomes more easily handled and more practical. It is preferable that the concentration of the polymer dispersant in the master batch is 1% or more and 60% or less. That is to say, when the concentration is higher than 60%, poor dispersion occurs in the resin, and when the concentration is less than 1%, the ability of suppressing aggregation of cellulose cannot be obtained sufficiently when the dispersant-containing resin composition is kneaded with cellulose. The concentration is preferably 10% to 40% and more preferably 20% to 30%.

As the resin used in preparing the dispersant-containing resin composition for dispersing cellulose, a thermoplastic resin is used because it is preferable to obtain the cellulose-dispersed resin composition through melt-kneading. Examples of the thermoplastic resin include olefin-based resins, nylon resins, polyamide-based resins, polycarbonate-based resins, polysulfone-based resins, polyester-based resins, and cellulose-based resins such as triacetylated cellulose and diacetylated cellulose. Examples of the polyamide-based resin include polyamide 6 (PA6, ring-opening polymerization product of ε-caprolactam), polyamide 66 (PA66, polyhexamethyleneadipamide), polyamide 11 (PA11, polyamide obtained through ring-opening polycondensation of undecane lactam), and polyamide 12 (PA12, polyamide obtained through ring-opening polycondensation of lauryl lactam).

Among the above-described thermoplastic resins, it is preferable to use the olefin-based resins because the olefin-based resins have advantages that the stiffening effect can sufficiently be obtained when used for preparing a cellulose-dispersed resin composition and that the olefin-based resins are inexpensive. Examples of the olefin-based resin include polyethylene-based resins, polypropylene-based resins, vinyl chloride resins, styrene resins, (meth)acrylic resins, and vinyl ether resins. These thermoplastic resins may be used alone or may be used as a mixed resin of two or more thereof. Among the olefin-based resins, polyethylene-based resins (PE) such as high density polyethylene (HDPE), low density polyethylene (LDPE), and bio-polyethylene, polypropylene resins (PP), vinyl chloride resins, styrene resins, (meth)acrylic resins, and vinyl ether resins, etc. are preferable because these resins have advantages that the stiffening effect can sufficiently be obtained when used for preparing a resin composition and that these resins are inexpensive.

(Preparation of Cellulose-Dispersed Resin Composition-2)

The cellulose-dispersed resin composition can be obtained by kneading cellulose in a water-containing state and the dispersant-containing resin composition for dispersing cellulose. An untreated resin may be added for kneading in order to adjust the concentration of cellulose and the concentration of the dispersant. The cellulose-dispersed resin composition thus obtained has a favorable dispersibility of cellulose and favorable mechanical properties because the polymer dispersant according to the present invention is used therein.

EXAMPLES

Hereinafter, the present invention will be described in more detail giving Examples and Comparative Examples, however the present invention is not limited to Examples. Hereinafter, "parts" and "%" are on a mass-basis unless otherwise noticed.

[Example 1] (Synthesis of Polymer Dispersant-1 Through RTCP Method)

Into a reaction apparatus equipped with a stirrer, a reflux condenser, a thermometer, and a nitrogen introducing pipe, 106 parts of diethylene glycol dimethyl ether (hereinafter, abbreviated as DMDG), 70 parts of dicyclopentenyloxyethyl methacrylate (hereinafter, abbreviated as DCPOEMA), 1.0 part of iodine, 0.2 parts of diphenylmethane (hereinafter, abbreviated as DPM), and, as an initiator, 5.0 parts of 2,2'-azobis(4-methoxy-2,4-dimethylvaleronitrile) [trade name: V-70 (hereinafter, abbreviated as V-70) manufactured by Wako Pure Chemical Industries, Ltd.] were added. The resultant mixture was then stirred and heated to 40° C. while a nitrogen gas was introduced in the mixture. Polymerization was conducted for 7 hours while the reaction system was held at 40° C., and thus a polymer block A was obtained. The progress status of polymerization was calculated from the solid concentration in the reaction system to find that the polymerization rate was 85%. Any of the polymerization rates as referred to hereinafter is a value calculated from the solid concentration. Moreover, the molecular weight was measured by gel permeation chromatography using a tetrahydrofuran (hereinafter, abbreviated as THF) solvent to find that the number average molecular weight (hereinafter, abbreviated as Mn) was 4900 in terms of polystyrene and the molecular weight distribution (weight average molecular weight/number average molecular weight, hereinafter abbreviated as PDI) was 1.33. Hereinafter, the molecular weight refers to a molecular weight in terms of polystyrene measured by GPC using a THF solvent. The polymer block A obtained above functions as a resin-affinitive segment as will be described later.

Subsequently, 30 parts of 2-hydroxyethyl methacrylate (hereinafter, abbreviated as HEMA) were added to the reaction system, and polymerization was conducted at 40° C. for 4 hours to form a polymer block B. The polymer block B functions as a cellulose-adsorptive segment. The progress status of polymerization was calculated from the solid concentration in the reaction system to find that the total polymerization rate was almost 100%, Mn was 7600, and PDI was 1.40. That is to say, in the A-B block copolymer according to the present invention, the total Mn was 7600, and since Mn of the polymer block A is 4900, the number average molecular weight of the polymer block B can be calculated from the equation 7600-4900 to give 2700. In the manner as described above, a polymerization solution of polymer dispersant-1 being an A-B block copolymer of Example 1 and having a polymer block of the resin-affinitive segment A and a polymer block of the cellulose-adsorptive segment B was obtained through an RTCP method. In addition, since the polymerization rate of the polymer block A is 85%, 10.5 parts of a residual monomer are present, and since the polymerization rate was 100% after the polymer block B was subsequently added, the content of the methacrylate-based monomer contained in the polymer block B and having a hydroxy group is 74%.

Subsequently, 200 parts of the polymerization solution obtained in the manner as described above were put into 200 parts of a water/methanol mixed liquid (water/methanol=3/1 as a mass ratio) under stirring with a disper, and thus a resin was precipitated. The precipitate was filtered and washed 2 times with 200 parts of the water/methanol mixed solution to obtain a light yellow resin. Further, the obtained precipitate was dried at 80° C. for 24 hours to obtain 92 parts of solid polymer disperdant-1. By the polymerization method utilized in the present invention, commercially-available, inexpensive materials were able to be used, which is advantageous in terms of cost, and a solid that had a light yellow color and that was substantially odorless was able to be obtained as a product.

[Example 2] (Synthesis of Polymer Dispersant-2 Through RTCP Method)

Polymerization was conducted in the same manner as in Example 1 except that HEMA in Example 1 was changed to glyceryl monomethacrylate (GLMA manufactured by NOF Corporation). With respect to a polymer block A, the polymerization yield was 80%, the number average molecular weight was 3900, and PDI was 1.28. With respect to the whole copolymer, the polymerization yield was almost 100%, Mn was 8100, and PDI was 1.42. With respect to a polymer block B, the number average molecular weight was found to be 8100-3900=4200. Moreover, the content of the methacrylate having a hydroxy group in the polymer block B was found to be 68% when calculated in the same manner as in Example 1. The amount of the monomer having a hydroxy group is smaller when compared with that in Example 1, but is considered to be sufficient in terms of the number of hydroxy groups. The copolymer was precipitated in the same manner as in Example 1 to obtain a resin solid. The resin solid is denoted as polymer dispersant-2.

[Example 3] (Synthesis of Polymer Dispersant-3 Through RTCP Method)

An A-B block copolymer was synthesized, as described below, in the same manner as in Example 1 except that the solvent and the monomers were changed. That is to say, diethylene glycol diethyl ether was used as the solvent in place of DMDG and stearyl methacrylate (SMA) was used in place of DCPOEMA in the polymer block A of Example 1, and thus a polymer block A was synthesized. With respect to the polymer block A, the polymerization rate was almost 100%, the number average molecular weight was 5600, and PDI was 1.15. Subsequently, the same amount of HEMA as in Example 1 was added in the reaction mixture, further, 3 parts of methacrylic acid (MAA) were mixed, and then the resultant mixture was subjected to polymerization to form a polymer block B. The polymerization was almost 100%, the number average molecular weight was 7700, and PDI was 1.25. The number average molecular weight of the polymer block B was found to be 7700−5600=1900. This means that 90.9% of the cellulose-adsorptive segment B is constituted by a methacrylate-based monomer having a hydroxy group and 9.1% is constituted by a monomer having a carboxy group.

Subsequently, an alkali water obtained by dissolving 1.3 parts of sodium hydroxide in 106 parts of water were added to the reaction mixture to obtain a clouded, viscous, aqueous solution. Subsequently, when water was further added to the aqueous solution to adjust the resin content to 10%, a white, transparent-feeling aqueous dispersion was obtained. The aqueous dispersion is denoted as polymer dispersant-3. Sedimentation was not observed at all even though the aqueous dispersion was stored for a long period of time to find that the aqueous dispersion was stable.

[Example 4] (Synthesis of Polymer Dispersant-4 Through RTCP Method)

An A-B block copolymer was synthesized, as described below, in the same manner as in Example 1 except that the solvent and the monomers were changed. That is to say, propylene glycol monopropyl ether was used as the solvent in place of DMDG and 100 parts of lauryl methacrylate (LMA) and 40 parts of DCPOEA were used in place of DCPOEMA in the polymer block A of Example 1. With respect to the polymer block A, the polymerization rate was almost 100%, the number average molecular weight was 9800, and PDI was 1.15. Subsequently, 70 parts of a methyl methacrylate solution containing methacryloyloxyethyl ethylene urea (manufactured by BASF SE, part of methyl methacrylate was removed under reduced pressure from a methyl methacrylate solution containing 25% by mass of effective ingredients to make the effective ingredients 50% by mass) in place of HEMA were added, and the resultant mixture were subjected to polymerization to form a polymer block B. The polymerization rate was almost 100%, the number average molecular weight was 12000, and PDI was 1.46. The number average molecular weight of the polymer block B was 2200, and the content of the methacrylate-based monomer having a urea group was 50% by mass. The block copolymer was precipitated in the same manner as in Example 1 to obtain a resin solid. The resin solid is denoted as polymer dispersant-4.

[Example 5] (Synthesis of Polymer Dispersant-5 Through RTCP Method)

A polymer block A was obtained in the same manner as in Example 1 except that the polymerization time was changed to 9 hours. With respect to the polymer block A, the polymerization rate was 100%, the number average molecular weight was 5600, and PDI was 1.40. Subsequently, 30 parts of HEMA and 13.3 parts of propylene glycol monopropyl ether containing 30% by mass of methacryloyloxyethyl benzyl trimethyl ammonium chloride were added to the reaction mixture, and the resultant mixture was subjected to polymerization. The molecular weight, etc. of the obtained polymerized product were measured changing the measurement system from GPC using a THF solvent to GPC using as an eluent a dimethylformamide solution containing 10 mL/L of lithium bromide to find that the polymerization rate was almost 100%, the number average molecular weight was 8200, and PDI was 1.40. With respect to the polymer block B, the number average molecular weight was 2600, the content of the methacrylate-based monomer having a hydroxy group was 88.2% by mass, and the content of the monomer having an ionic group was 11.8%.

Subsequently, 200 parts of the resin solution was gradually added to 800 parts of water under high-speed stirring with a disper to obtain a milky-white aqueous dispersion. The aqueous dispersion is denoted as polymer dispersant-5. Sedimentation was not observed at all even though the aqueous dispersion was stored for a long period of time to find the aqueous dispersion was stable.

[Comparative Example 1] (Synthesis of Comparative Polymer Dispersant-1 Through Radical Polymerization Method)

The same apparatus as the one used in Example 1 was used, and 107 parts of DMDG were placed in the apparatus and were heated to 70° C. while a nitrogen gas was introduced therein. In another container, 70 parts of DCPOEMA, 30 parts of HEMA, and 5.0 parts of 2,2'-azobis(2,4-dimethylvaleronitrile) [trade name: V-65 (hereinafter, abbreviated as V-65) manufactured by Wako Pure Chemical Industries, Inc.] were placed, stirred and made uniform to prepare a monomer mixed liquid. Subsequently, a dropping funnel was attached to the reaction apparatus, and the monomer mixed liquid prepared above was placed in the dropping funnel and dropped into the reaction mixture over 2 hours. Further, 2 parts of V-65 were added an hour after dropping, and polymerization was further conducted for 5 hours to obtain a polymerization solution of polymer dispersant-2. The solid content was measured to calculate the polymerization rate to find that the polymerization rate was almost 100%. Mn was 8000, and PDI was 1.81.

Subsequently, from the resin solution obtained above, a resin was precipitated, washed, and dried in the same manner as in Example 1 to obtain 90 parts of solid polymer dispersant-2. Polymer dispersant-2 has the same monomer composition as that of polymer dispersant-1 of Example 1 and has a random structure. Polymer dispersant-2 is denoted as comparative polymer dispersant-1 of Comparative Example 1.

[Comparative Example 2] (Synthesis of Comparative Polymer Dispersant-2 Through ATRP Method Being Living Radical Polymerization Method (LRP Method) Using Heavy Metal Catalyst)

The same reaction apparatus as the one used in Example 1 was used, and 106 parts of DMDG, 70 parts of DCPOEMA, 2.2 parts of ethyl 2-bromoisobutyrate, and 2.0 parts of pentamethyldiethylenetriamine were placed therein, and the resultant mixture was sufficiently deaerated by nitrogen gas babbling. Subsequently, 1.6 parts of copper (I) bromide were added thereto to form a copper complex. The color of the system turned into green. Subsequently, the resultant mixture was heated to 80° C. and subjected to polymerization for 3 hours. The solid content was measured taking out part of the polymerization solution as a sample and the polymerization rate was calculated to be 81.1%. Moreover, the molecular weight, etc. were measured to find that Mn was 5000 and PDI was 1.21. In the manner as described above, a polymer block of a resin-affinitive segment A was obtained.

Subsequently, 30 parts of HEMA were weighed, placed in another container and deaerated by nitrogen gas babbling with a nitrogen gas introducing pipe installed in the container. Subsequently, the deaerated HEMA was added to the above-described reaction system, and polymerization was conducted at 80° C. for 5 hours to form a polymer block of a cellulose-adsorptive segment B. The color of the polymerization solution was finally turned into transparent blue. As a result of calculating the progress of polymerization from the solid concentration in the reaction system, total polymerization rate was almost 100%, Mn was 7300, and PDI was 1.32. From the results that Mn of the A-B block copolymer was 7300 and Mn of the polymer block A was 5000, the number average molecular weight of the polymer block B is calculated to be 2300. In the manner as describe above, a polymerization solution containing comparative polymer dispersant-2 of Comparative Example 2, being an A-B block copolymer having a polymer block of a resin-affinitive segment A and having a polymer block of a cellulose-adsorptive segment B was obtained through an LRP method using a heavy metal.

A resin is precipitated in a water/methanol mixed solution from the blue polymerization solution obtained above in the same manner as in Example 1. However, the color of the obtained precipitate was blue. The reason is considered to be as follows: namely, as described above, synthesis was conducted by the polymerization method in which a copper ion was used in Comparative Example 2, and copper was taken in the resin obtained through polymerization. Thus, the precipitate was dissolved again in DMDG in such a way that the solid content thereof was 50% by mass, and was then precipitated again in water/methanol mixed solution. As a result, the blueness became light but was still left. Thus, dissolving the resin in DMDG and precipitating the resin in water/methanol were repeated until the color of the resin turned into almost white. When the cycle of dissolution and precipitation was repeated 5 times in total, a resin the color of which was almost white was obtained. The obtained resin was dried in the same manner as in Example 1 to obtain 80 parts of solid comparative polymer dispersant-2 of Comparative Example 2.

As described above, in the case where the synthesis was conducted by the LRP method in which a heavy metal was used, sufficient purification was needed to remove the heavy metal taken in the resin, and it was confirmed that a large amount of organic solvent or solvent for precipitation was needed in order to remove the heavy metal. From this point of view, it can be said that the synthesis making use of the LRP method in which a heavy metal is used has an adverse effect on environment and is problematic in terms of resource conservation and energy conservation. Further, the waste liquid that is produced as a result of purification and that contains a copper ion cannot be disposed as it is, therefore it is necessary to recover the copper ion, and recovering the copper ion is complicated and requires cost and time as well as using a large amount of the solvent. Moreover, repeating precipitation, dissolution, and filtration worsened the yield of each process resulting in a low product yield, and therefore the synthesis making use of the LRP method cannot practically be adopted. On the other hand, the polymerization method that is utilized in the present invention and that does not use a heavy metal is extremely environmental-friendly, can achieve energy conservation and resource conservation, gives a high product yield, and is advantageous in terms of cost as shown in Example 1.

[Comparative Example 3] (Synthesis of Comparative Polymer Dispersant-3 Through NMP Method Using Nitroxide Compound)

The same reaction apparatus as the one used in Example 1 was used, and 106 parts of DMDG, 70 parts of DCPOEMA, and 4.3 parts of a nitroxide compound (Block-builder MA manufactured by ARKEMA) represented by the following structure were placed therein.

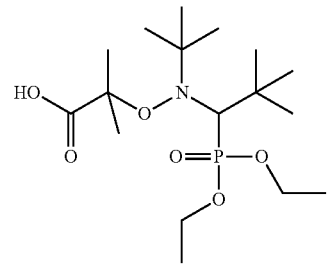 [SMILES: CCOP(=O)(OCC)C(N(OC(C)(C)C(=O)O)C(C)(C)C)C(C)(C)C]

The resultant mixture was heated to 105° C. over 1 hour under a nitrogen gas stream. Polymerization was then conducted for 5 hours while the temperature of the reaction system was held at 105° C. to obtain a polymer block of a resin-affinitive segment A. As a result of calculation from the solid concentration in the reaction system determined taking out part of the reaction system as a sample, the polymerization rate was determined to be 78%. Moreover, the molecular weight was 4200 and PDI was 1.62, and therefore the result was that the molecular distribution was broad.

Subsequently, 30 parts of HEMA were added to the reaction system, and polymerization was conducted at 105° C. for 5 hours to form a polymer block of a cellulose-adsorptive segment B. As a result of calculation from the solid concentration, the total polymerization rate was 76%, Mn was 5500, and PDI was 1.89. The result was that the polymerization yield was lower and the molecular weight distribution was broader when compared with the polymerization yield and the molecular weight distribution in Example 1. Moreover, a shoulder peak was confirmed in a low molecular weight side. The reason for the existence of the shoulder peak is considered to be as follows: namely, the polymer block A was not able to contribute to polymerization and as a result, terminals became inactive. With respect to the molecular weight, Mn of the whole A-B block copolymer was 5500, Mn of the polymer block A was 4200, and therefore the number average molecular weight of the polymer block B, which is calculated from the equation 5500-4200, was found to be 1300. In the manner as described above, a polymerization solution of comparative polymer dispersant-3 of Comparative Example 3, being an A-B block copolymer having a polymer block of a resin-affinitive segment A and having a polymer block of a cellulose-adsorptive segment B was obtained through an NMR method.

From the above results, it was confirmed that a precise control was not able to be achieved with a methacrylate-based monomer in the NMP method, which is not a polymerization method according to the present invention, even though the monomer composition was the same as that used in the RTCP method, and it was proven that the RTCP method, which is the polymerization method according to the present invention, is preferred.

Moreover, although the polymerization rate was poor, a resin was precipitated and washed in the same manner as in Example 1. However, since the polymerization rate was low, monomers were left and there was the odor of monomers. Thus, dissolution of the resin into DMDG and precipitation of the resin in the water/methanol mixed solution were repeated twice to obtain a white resin. The odor of residual monomers was reduced. The obtained precipitate was dried at 80° C. for 24 hours to obtain 80 parts of a solid polymer dispersant. The solid polymer dispersant is denoted as comparative polymer dispersant-3.

[Comparative Example 4] (Synthesis of Comparative Polymer Dispersant-4 Through RAFT Method Using Sulfur Compound)

The same reaction apparatus as the one used in Example 1 was used, and 106 parts of DMDG, 70 parts of DCPOEMA, 3.1 parts of a dithioester compound represented by the following structure (manufactured by Sigma-Aldrich Co., LLC.), and, further, 1.0 part of V-70 were placed therein.

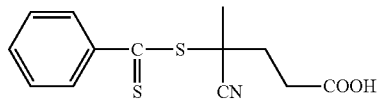

The resultant mixture was heated to 50° C. over 1 hour under a nitrogen gas stream. Polymerization was then conducted for 5 hours while the temperature of the reaction system was held at 50° C. to obtain a polymer block of a resin-affinitive segment A. As a result of calculation from the solid concentration in the reaction system determined taking out part of the reaction system as a sample, the polymerization rate was determined to be 90%. Moreover, Mn was 5300 and PDI was 1.88, and therefore the result was that the molecular distribution was broad.

Subsequently, 30 parts of HEMA were added to the reaction system, and polymerization was conducted at 50° C. for 5 hours to form a polymer block of a cellulose-adsorptive segment B. As a result of calculation from the solid concentration, the total polymerization rate was almost 100%, Mn was 7900, and PDI was 2.01. The result was that although polymerization progressed, the molecular weight distribution was broad. From the results that Mn of the A-B block copolymer was 7900 and Mn of the polymer block A was 5300, the number average molecular weight of the polymer block B determined by calculation was 2600. In the manner as described above, a polymerization solution of comparative polymer dispersant-4 of Comparative Example 4, being an A-B block copolymer having a polymer block of a resin-affinitive segment A and having a polymer block of a cellulose-adsorptive segment B, was obtained through an RAFT method. The obtained polymerization solution was a yellowish transparent solution, and was a resin solution having a mercapto-based bad odor.

Using the polymerization solution obtained above, a resin was precipitated in a water/methanol mixed solution, and the obtained precipitate was washed with a water/methanol solution and was dried at 80° C. for 24 hours to obtain 98 parts of a white solid comparative polymer dispersant-4 of Comparative Example 4. As described above, the RAFT method used in Comparative Example 4 generates the odor of sulfur compounds very much and therefore is considered to be inadequate from the viewpoint of operability and manufacturing process. Further, the thioester compounds are special and unsuitable for mass production, and therefore the RAFT method is disadvantageous in terms of cost when put into practical use. Accordingly, it is suggested that the polymerization method as specified in the present invention be much advantageous when compared with the RAFT method.

[Production Example 1] (Preparation of Cellulose Nanofiber (CNF))

First of all, 19400 parts of water were added to 600 parts of softwood bleached kraft pulp (NBKP) [refiner treated, solid content: 25%] to prepare an aqueous suspension liquid (slurry) having a pulp slurry concentration of 0.75% by mass. Subsequently, the obtained slurry was subjected to mechanical defibration treatment using a bead mill. After the defibration treatment was completed, the slurry was dehydrated with a filter press to obtain 570 parts of CNF-1 (solid content: 25%) in a water-containing state.

[Example 6] (Treatment of Cellulose with Polymer Dispersant-1)

In 25 parts of DMDG, 10 parts of polymer dispersant-1 prepared previously were dissolved, 0.2 parts of oleylamine acetate as a cationic surface active agent were then added thereto, and 64.8 parts of water were subsequently dropped thereto while the resultant mixture was uniformly stirred to obtain 100 parts of an aqueous dispersion treatment agent solution containing 10% by mass of polymer dispersant-1. In the obtained solution, polymer dispersant-1 was dispersed in a light-yellowish clouded state, and even when the solution was left to stand for 24 hours, sedimentation was not observed.

Subsequently, to 40 parts of previously prepared CNF-1 (solid content: 25%) in a water-containing state, 100 parts of the above obtained aqueous dispersion treatment agent solution containing polymer dispersant-1 were added and sufficiently mixed to obtain 140 parts of a readily dispersible cellulose composition in which cellulose was treated with polymer dispersant-1.

Examples 7 and 8

Moreover, aqueous dispersion treatment agent solutions were prepared in the same manner as described above using each of polymer dispersant-2 of Example 2 and polymer dispersant-4 of Example 4 in place of polymer dispersant-1 of Example 1. Each polymer dispersant was dispersed in a light-yellowish clouded state, and sedimentation was not observed. Subsequently, readily dispersible cellulose compositions were prepared by treating CNF-1 in the same manner as described above.

Examples 9 and 10

To 40 parts of previously prepared CNF-1 (solid content: 25%) in a water-containing state, 100 parts of the above obtained aqueous dispersion treatment agent solution containing polymer dispersant-3 or -5 were added and sufficiently mixed to obtain a readily dispersible cellulose composition in which cellulose was treated with polymer dispersant-3 or -5.

[Comparative Examples 5 to 8] (Treatment of Cellulose with Comparative Polymer Dispersant-1 to 4)

Treatment of CNF-1 with each of the comparative polymer dispersants 1 to 4 prepared in Comparative Examples 1 to 4 respectively was conducted in the same manner as in Example 2 to obtain 140 parts of each cellulose composition of Comparative Examples, in which cellulose was treated with each polymer dispersant. The obtained CNF compositions were denoted as Comparative Examples 5 to 8.

[Example 11] (Preparation of Kneaded Composition Containing Readily Dispersible Cellulose Composition and Resin)

Into 40 parts of the readily dispersible cellulose composition which was prepared in Example 6 and in which cellulose was treated with polymer dispersant-1, 80 parts of a fine particle polyethylene [Flow Beads HE-3040 (trade name) manufactured by Sumitomo Seika Chemicals Co., Ltd., hereinafter abbreviated as "fine particle PE"] were added in a state where the fine particle polyethylene was wetted with 50 parts of water, and the cellulose composition and the fine particle PE were mixed. The resultant mixture was filtered and dried to remove water and DMDG in the mixture, and thus 98 parts of a cellulose-dispersed resin composition being a mixed composition of: CNF-1 which was treated with polymer dispersant-1; and a fine particle PE.

[Examples 12 to 15] (Preparation of Kneaded Composition Containing Readily Dispersible Cellulose Composition and Resin)

In the same manner as in Example 11, cellulose-dispersed resin compositions were each obtained using each of readily dispersible cellulose compositions of Examples 7 to 10 in place of the readily dispersible cellulose composition of Example 6 in Example 11.

[Evaluation] (Twin-Screw Extrusion Kneading, Injection Molding, and Tensile Test)

Evaluation of twin-screw extrusion kneading, injection molding, and tensile elasticity and tensile strength by a tensile test was conducted by the method described below for the mixed composition of CNF-1 and a fine particle PE obtained above. Specifically, twin-screw extrusion kneading was conducted at a kneading temperature of 140° C., and the kneaded product was ejected in a strand form, cooled, and cut with a pelletizer to prepare a PE resin pellet containing CNF-1 dispersed therein. Injection molding was then conducted using the obtained PE resin pellet containing CNF-1 dispersed therein to prepare a dumbbell-shaped test piece (thickness of dumbbell: 2 mm), and the dumbbell-shaped test piece was used as a sample for evaluation. Tensile test was conducted for the dumbbell-like test piece as a sample for evaluation with a tensile tester (manufactured by Instron: universal testing instruments 5900 series) at a tensile speed of 10 mm/min to measure and evaluate the tensile elasticity and tensile strength. The same tests and evaluation as described above were conducted in the same manner as described above using respective readily dispersible cellulose compositions in which cellulose was treated with respective polymer dispersants-2 to 5 obtained in Examples 7 to 10 respectively. The results are shown together in Table 3.

[Comparative Examples 9 to 12] (Kneading of Resin Composition Containing Polymer Dispersant-Treated CNF and Resin)

Mixed compositions of a cellulose composition and PE were prepared in the same manner as in Example 3 using each cellulose composition in which cellulose was treated with each of comparative polymer dispersants-1 to 4 of Comparative Examples 5 to 8 respectively, and twin-screw extrusion kneading, injection molding, and tensile test were conducted using each mixed composition to evaluate tensile elasticity and tensile strength. Respective sets of test and evaluation correspond to Comparative Examples 9 to 12. The results are shown together in Table 3.

[Example 16] (Preparation of Dispersant-Containing Resin Composition for Dispersing Cellulose)

To 1000 parts of water, 119.8 parts of the polymerization solution (solid concentration: 50.1%) of polymer dispersant-1 synthesized in Example 1 were added under stirring to precipitate polymer dispersant-1, and by stirring the precipitated polymer dispersant-1 at a high speed in water, the precipitated polymer dispersant-1 was dispersed in water as a fine pulverized form. Subsequently, 140 parts of the fine particle PE being the same as the one used in Example 3 were added thereto, and the resultant mixture was stirred so that the fine particle PE and polymer dispersant-1 might be uniform. The mixture was then filtered, and dried at 80° C. to obtain 199 parts of a dispersant-containing resin composition for dispersing cellulose, the resin composition containing polymer dispersant-1 and a fine particle PE. Twin-screw extrusion kneading of the composition was conducted under the kneading condition at 140° C., and the kneaded product was ejected in a fine strand form, cooled, and cut with a pelletizer to obtain a kneaded composition containing finely granular polymer dispersant-1 and PE resin. In the kneaded composition, polymer dispersant-1 and the PE resin are contained in a ratio of 30% by mass to 70% by mass.

[Example 17] (Preparation of Cellulose-Dispersed Resin Composition)

To 500 parts of water, 40 parts of CNF-1 (solid content: 25%) in a water-containing state were added, and the resultant mixture was stirred at a high speed to make CNF-1 in a slurry form. Subsequently, 33.3 parts of the finely granular kneaded composition prepared in Example 4 and 56.7 parts of the fine particle PE were added to the slurry, and the resultant mixture was stirred and made uniform, and then filtered to obtain 120 parts of a mixed composition in a water-containing state. The mixed composition in a water-containing state contains 10 parts of polymer dispersant-1, 10 parts of CNF-1, and 80 parts of the PE resin, and is in a state containing 20 parts of water. The mixed composition was put in a twin-screw extruder while the water-containing state of the mixed composition was maintained. Kneading was then conducted in such a way that the kneading temperature was set to 140° C. and vent holes were open in order to remove water, and the kneaded product was ejected in a strand form, cooled, and cut with a pelletizer to obtain a PE resin pellet containing CNF-1 dispersed therein. Injection molding and the tensile test were conducted to evaluate the tensile elasticity and tensile strength in the same manner as in Example 3. The results are shown in Table 3.

[Evaluation Results] (Differences in Molecular Structures of Polymer Dispersants Depending on Polymerization Methods)

Differences in the structures of A-B block copolymers that constitute the polymer dispersants of Example 1 and Comparative Examples and that are obtained through different polymerization methods are shown together in Table 1.

TABLE 1

Properties of polymer dispersants of Example and Comparative Examples

| | Polymerization method | Resin-affinitive block A (DCPOEMA) Mn | PDI | CNF-adsorptive block B (HEMA) Mn | A-B block copolymer Mn | PDI | Polymerization rate |
|---|---|---|---|---|---|---|---|
| Polymer dispersant-1 (Example-1) | RTCP | 4900 | 1.33 | 2700 | 7600 | 1.40 | 100% |
| Comparative polymer dispersant-1 (Comparative Example-1) | Random copolymerization | — | — | — | 8000 (Random) | 1.90 (Random) | 100% |
| Comparative polymer dispersant-2 (Comparative Example-2) | ATRP | 5000 | 1.21 | 2300 | 7300 | 1.32 | 100% |
| Comparative polymer dispersant-3 (Comparative Example-3) | NMP | 4200 | 1.62 | 1300 | 5500 | 1.89 | 76% |
| Comparative polymer dispersant-4 (Comparative Example-4) | RAFT | 5300 | 1.57 | 2600 | 7900 | 1.65 | 100% |

(Comparison of Polymerization Methods for Obtaining Respective Polymer Dispersants and Comparison of Performance of Respective Resin Compositions)

Differences depending on the polymerization methods used for obtaining respective polymer dispersants of Example 1 and Comparative Examples 1 to 4 are shown together in Table 2. Specifically, each of four evaluation items in polymerization conditions: how easily the molecular structure of a copolymer to be obtained can be controlled; to what extent the polymerization temperature can be decreased; occurrence of odor; how easily purification can be conducted; and cost was relatively evaluated in three grades of "A, B, and C", and the results are shown together in Table 2. Moreover, results of comparing mechanical properties for kneaded resin compositions containing CNF-1 and the fine particle PE, the kneaded resin compositions prepared, in the manner as described previously, using respective polymer dispersants of Example and Comparative Examples are shown together in Table 3.

TABLE 2

Comparison of respective polymerization methods used

| | Polymerization method | Relative evaluation results of polymerization methods | | | | |
|---|---|---|---|---|---|---|
| | | Molecular structure control | Polymerization temperature | Odor | Purification | Cost |
| Polymer dispersant-1 (Example-1) | RTCP | A | A | A | A | B |
| Comparative polymer dispersant-1 (Comparative Example-1) | Random copolymerization | C | B | A | A | A |
| Comparative polymer dispersant-2 (Comparative Example-2) | ATRP | A | B | A | C | B |
| Comparative polymer dispersant-3 (Comparative Example-3) | NMP | C | C | A | B | C |
| Comparative polymer dispersant-4 (Comparative Example-4) | RAFT | B | B | C | C | C |

TABLE 3

Evaluation results of mechanical properties

| CNF-dispersed resin composition | Polymer dispersant | Tensile elasticity (GPa) | Tensile strength (MPa) |
|---|---|---|---|
| Example 11 | Polymer dispersant-1 | 2.65 | 40.0 |
| Example 12 | Polymer dispersant-2 | 2.56 | 39.5 |
| Example 13 | Polymer dispersant-3 | 2.49 | 38.9 |
| Example 14 | Polymer dispersant-4 | 2.50 | 39.0 |
| Example 15 | Polymer dispersant-5 | 2.66 | 40.0 |
| Example 17 | Polymer dispersant-1 | 2.48 | 39.5 |
| Comparative Example 9 | Comparative polymer dispersant-1 | 1.85 | 34.2 |
| Comparative Example 10 | Comparative polymer dispersant-2 | 2.40 | 38.9 |
| Comparative Example 11 | Comparative polymer dispersant-3 | 1.75 | 30.8 |
| Comparative Example 12 | Comparative polymer dispersant-4 | 2.06 | 35.9 |

INDUSTRIAL APPLICABILITY

As a utilization example of the present invention, a high-performance polymer dispersant for cellulose that can be applied to cellulose being a hydrophilic substance and that has never existed so far can be provided in a simple, environmentally conscious, and economical manner. As a result, it is made possible to realize widespread utilization of a fine cellulose fiber, which is a renewable natural material and the function of which as an excellent filler has received a lot of attention but the utilization of which is not facilitated under the present circumstances because the fine cellulose fiber is a hydrophilic substance and therefore is hard to disperse in general purpose resins or other materials. The high-performance polymer dispersant for cellulose that can be applied to cellulose being a hydrophilic substance and that has never existed so far are provided in a simple manner at a high yield, thereby a cellulose composition that contains the polymer dispersant and cellulose and that is readily dispersible to thermoplastic resins being general purpose resins can be obtained in a simple manner by treating cellulose with the polymer dispersant, and as a result, the remarkable effects according to the present invention are obtained. The cellulose-dispersed resin composition provided by the present invention is excellent in mechanical properties and is practically valuable, and therefore widespread utilization thereof is expected.

The invention claimed is:

1. A polymer dispersant for cellulose,
the polymer dispersant that is used for dispersing cellulose and is a polymer compound having a block copolymer structure comprising a resin-affinitive segment A and a cellulose-adsorptive segment B,
the polymer compound synthesized through a reversible chain transfer catalyzed polymerization (RTCP) method:
being a living radical polymerization method not using any of a heavy metal, a nitroxide compound, and a sulfur-based compound;
using an organic iodine compound as an initiation compound; and
using a phosphorus compound, a nitrogen compound, an oxygen compound, or a carbon compound as a catalyst.

2. The polymer dispersant for cellulose according to claim 1, wherein the polymer compound is an A-B block copolymer satisfying all of the following requirements (1) to (5):
   (1) 90% by mass or more of constituents of the A-B block copolymer is constituted by a methacrylate-based monomer or methacrylate-based monomers;
   (2) 50% by mass or more of constituents of the cellulose-adsorptive segment B is constituted by a methacrylate-based monomer having one or more hydroxy groups and/or a methacrylate-based monomer having a urea group, and the cellulose-adsorptive segment B does not have compatibility with thermoplastic resins;
   (3) the resin-affinitive segment A has a number average molecular weight of 500 to 20000 in terms of polystyrene in gel permeation chromatography, and a ratio of the resin-affinitive segment A in the whole A-B block copolymer is 5 to 95% by mass;
   (4) the cellulose-adsorptive segment B has a number average molecular weight of 500 to 20000 in terms of polystyrene in gel permeation chromatography, and a ratio of the cellulose-adsorptive segment B in the whole A-B block copolymer is 5 to 95% by mass; and
   (5) the A-B block copolymer has a number average molecular weight of 1000 to 40000 in terms of polystyrene in gel permeation chromatography and a molecular weight distribution index (weight average molecular weight/number average molecular weight) of 1.0 to 1.6.

3. The polymer dispersant for cellulose according to claim 2, wherein:
70% by mass or more of the constituents of the cellulose-adsorptive segment B is constituted by a methacrylate-based monomer having one or more hydroxy groups and/or a methacrylate-based monomer having a urea group in the requirement (2);
the resin-affinitive segment A has a number average molecular weight of 1000 to 8000 in terms of polystyrene in gel permeation chromatography, and the ratio of the resin-affinitive segment A in the whole A-B block copolymer is 30 to 70% by mass in the requirement (3);
the cellulose-adsorptive segment B has a number average molecular weight of 1000 to 8000 in terms of polystyrene in gel permeation chromatography, and the ratio of the cellulose-adsorptive segment B in the whole A-B block copolymer is 30 to 70% by mass in the requirement (4); and
the A-B block copolymer has a number average molecular weight of 2000 to 16000 in terms of polystyrene in gel permeation chromatography and the molecular weight distribution index (weight average molecular weight/number average molecular weight) of 1.0 to 1.6 in the requirement (5).

4. The polymer dispersant for cellulose according to claim 2, wherein, in the requirement (2), 70% by mass or more of the constituents of the cellulose-adsorptive segment B is constituted by a methacrylate-based monomer having one or more hydroxy groups and/or a methacrylate-based monomer having a urea group, and 3 to 15% by mass of the constituents of the cellulose-adsorptive segment B is constituted by a methacrylic acid neutralized with an alkali and/or a methacrylate-based monomer having a carboxy group neutralized with an alkali, or constituted by a methacrylate-based monomer having a quaternary ammonium salt group.

5. The polymer dispersant for cellulose according to claim 1, wherein the cellulose is at least one selected from the group consisting of a cellulose nanofiber, a cellulose nanocrystal, pulp, lignocellulose, and wood flour.

6. A polymer dispersant-containing aqueous dispersion treatment agent comprising a polymer dispersant having an improved dispersibility of cellulose, the aqueous dispersion treatment agent obtained by subjecting the polymer dispersant for cellulose according to claim 4 to dispersion treatment in an aqueous medium.

7. A polymer dispersant-containing aqueous dispersion treatment agent comprising a polymer dispersant having an improved dispersibility of cellulose, the aqueous dispersion treatment agent obtained by subjecting the polymer dispersant for cellulose according to claim 1 to dispersion treatment with a surface active agent in an aqueous medium.

8. The aqueous dispersion treatment agent according to claim 7, wherein the surface active agent is a cationic surface active agent.

9. A readily dispersible cellulose composition comprising:
the polymer dispersant for cellulose according to claim 1; and
at least one kind of cellulose selected from the group consisting of a cellulose nanofiber, a cellulose nanocrystal, pulp, lignocellulose, and wood flour.

10. A readily dispersible cellulose composition comprising:
the aqueous dispersion treatment agent according to claim 6; and
at least one kind of cellulose selected from the group consisting of a cellulose nanofiber, a cellulose nanocrystal, pulp, lignocellulose, and wood flour.

11. A cellulose-dispersed resin composition comprising:
the readily dispersible cellulose composition according to claim 9; and
a thermoplastic resin.

12. A dispersant-containing resin composition for dispersing cellulose, the resin composition comprising:
the polymer dispersant for cellulose according to claim 1; and
a thermoplastic resin.

13. A dispersant-containing resin composition for dispersing cellulose, the resin composition comprising:
the aqueous dispersion treatment agent according to claim 6; and
a thermoplastic resin.

14. A cellulose-dispersed resin composition comprising:
the dispersant-containing resin composition for dispersing cellulose according to claim 12; and
cellulose.

* * * * *